(12) United States Patent
Minagawa

(10) Patent No.: US 10,005,893 B2
(45) Date of Patent: Jun. 26, 2018

(54) RUBBER COMPOSITION FOR TIRE, AND PNEUMATIC TIRE

(71) Applicant: SUMITOMO RUBBER INDUSTRIES, LTD., Kobe-shi, Hyogo (JP)

(72) Inventor: Yasuhisa Minagawa, Kobe (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 0 days. days.

(21) Appl. No.: 14/755,443

(22) Filed: Jun. 30, 2015

(65) Prior Publication Data
US 2015/0299423 A1 Oct. 22, 2015

Related U.S. Application Data

(62) Division of application No. 13/641,954, filed as application No. PCT/JP2011/054468 on Feb. 28, 2011, now abandoned.

(30) Foreign Application Priority Data

Apr. 19, 2010 (JP) ................................ 2010-096282

(51) Int. Cl.
| | |
|---|---|
| C08K 3/00 | (2018.01) |
| C08K 3/26 | (2006.01) |
| C08K 5/09 | (2006.01) |
| C08K 3/36 | (2006.01) |
| C08K 5/548 | (2006.01) |
| B60C 1/00 | (2006.01) |
| C08K 3/22 | (2006.01) |

(52) U.S. Cl.
CPC ............. *C08K 5/09* (2013.01); *B60C 1/0016* (2013.01); *C08K 3/22* (2013.01); *C08K 3/26* (2013.01); *C08K 3/36* (2013.01); *C08K 5/548* (2013.01); *C08K 2003/2296* (2013.01); *Y02T 10/862* (2013.01)

(58) Field of Classification Search
None
See application file for complete search history.

(56) References Cited

U.S. PATENT DOCUMENTS

| | | | |
|---|---|---|---|
| 4,569,382 A | 2/1986 | Maxey et al. | |
| 5,652,310 A | 7/1997 | Hsu et al. | |
| 5,872,176 A | 2/1999 | Hergenrother et al. | |
| 6,005,027 A | 12/1999 | Guillet et al. | |
| 6,107,384 A | 8/2000 | Hatakeyama et al. | |
| 6,855,427 B2 | 2/2005 | Kunkeler et al. | |
| 7,493,927 B2 | 2/2009 | Minagawa et al. | |
| 7,569,632 B2 | 8/2009 | Minagawa et al. | |
| 2002/0188050 A1 | 12/2002 | Yagi et al. | |
| 2005/0187332 A1 | 8/2005 | Minagawa et al. | |
| 2007/0015861 A1 | 1/2007 | Minagawa et al. | |

FOREIGN PATENT DOCUMENTS

| | | |
|---|---|---|
| CN | 1388163 A | 1/2003 |
| CN | 1657558 A | 8/2005 |
| CN | 101111554 A | 1/2008 |
| EP | 0 794 188 A | 9/1997 |
| EP | 0 890 602 A1 | 1/1999 |
| EP | 1 566 404 A | 8/2005 |
| EP | 2 502 961 A1 | 9/2012 |
| GB | 2 284 214 A | 5/1995 |
| JP | 5-51484 A | 3/1993 |
| JP | 7-216234 A | 8/1995 |
| JP | 9-3206 A | 1/1997 |
| JP | 11-255964 A | 9/1999 |
| JP | 11-269313 A | 10/1999 |
| JP | 2000-219779 A | 8/2000 |
| JP | 2001-233997 A | 8/2001 |
| JP | 2001-247718 A | 9/2001 |
| JP | 2002-13084 A | 1/2002 |
| JP | 2005-232295 A | 9/2005 |
| JP | 2006-265400 A | 10/2006 |
| JP | 2007-56137 A | 3/2007 |
| JP | 2007-77322 A1 | 3/2007 |
| JP | 2007-99896 A | 4/2007 |
| JP | 2008-115220 A | 5/2008 |
| JP | 2008-169350 A | 7/2008 |
| KR | 2002-0032846 A | 5/2002 |
| WO | WO 2011/062099 A1 | 5/2011 |

OTHER PUBLICATIONS

Full translation of Yagi JP 2000_219779, Aug. 8, 2000, pp. 1-23.*
Aldrich: Handbook of Fine Chemicals and Laboratory Equipment, 2003-2004, pp. 1579.
European Search Report dated May 5, 2011 for Application No. 05001051.
International Search Report dated Apr. 12, 2011, issued in PCT/JP2011/054468.
Machine English translation of JP-2001-247718-A published Sep. 11, 2001.
Machine English translation of JP-2005-232295-A published Sep. 2, 2005.
Machine English translation of JP-2006-265400-A published Oct. 5, 2006.
Machine English translation of JP-2007-056137-A published Mar. 8, 2007.
Machine English translation of JP-2007-099896-A published Apr. 19, 2007.
Machine English translation of JP-2008-115220-A published May 22, 2008.

(Continued)

*Primary Examiner* — Robert T Butcher
(74) *Attorney, Agent, or Firm* — Birch, Stewart, Kolasch & Birch, LLP

(57) ABSTRACT

The present invention provides a rubber composition for a tire, which has an increased rate of reaction between a silane coupling agent and silica so that its performances including fuel economy and abrasion resistance can be enhanced; and a pneumatic tire formed from the rubber composition. The present invention relates to a rubber composition for a tire, containing: diene rubber; silica; a silane coupling agent; and a carbonate salt and/or a hydrogen carbonate salt, wherein the rubber composition has a total content of the carbonate salt and the hydrogen carbonate salt of 0.3 to 25 parts by mass relative to 100 parts by mass of the silica.

8 Claims, No Drawings

(56) References Cited

OTHER PUBLICATIONS

Machine English translation of JP-2008-169350-A published Jul. 24, 2008.
Office Action dated Sep. 11, 2007 for Japanese Application No. 2004-042661.

* cited by examiner

RUBBER COMPOSITION FOR TIRE, AND PNEUMATIC TIRE

CROSS-REFERENCE TO RELATED APPLICATIONS

The present application is a 37 C.F.R. § 1.53(b) divisional of U.S. application Ser. No. 13/641,954 filed Nov. 7, 2012, which is the National Phase of PCT International Application No. PCT/JP2011/054468 filed Feb. 29, 2011, which claims priority on Japanese Patent Application No. 2010-096282 filed Apr. 19, 2010. The entire contents of each of these applications is hereby incorporated by reference.

TECHNICAL FIELD

The present invention relates to a rubber composition for a tire, and a pneumatic tire formed from the rubber composition.

BACKGROUND ART

Conventionally, silica has been used as a reinforcing filler in order to enhance the performances of tires such as durability (abrasion resistance) and fuel economy. Also, because a satisfactory effect cannot be achieved by using silica alone, silica has been used in combination with a silane coupling agent that bonds silica to the rubber component.

In order for a silane coupling agent to react with silica, it is necessary for an alkoxy group or the like bonded to the silicon atom in the silane coupling agent to be hydrolyzed to form a silanol group. However, because hydrolysis reaction of an alkoxy group or the like will not proceed in a short period of time, it has been difficult to bring about sufficient hydrolysis of an alkoxy group or the like in a rubber kneading step. Conventionally, therefore, the rate of reaction between a silane coupling agent and silica is low and the performance of silica cannot be maximized.

As the method for solving the above-mentioned problem, Patent Literatures 1 to 3 disclose adding boric acid or the like in a rubber composition. Still, further improvement in terms of the rate of reaction and the like is desired.

CITATION LIST

Patent Literature

Patent Literature 1: JP-A 2007-77322
Patent Literature 2: JP-A 2001-247718
Patent Literature 3: JP-A 2005-232295

SUMMARY OF INVENTION

Technical Problem

An object of the present invention is to solve the aforementioned problem and provide a rubber composition for a tire, which has an increased rate of reaction between a silane coupling agent and silica so that its performances including fuel economy and abrasion resistance can be enhanced; and a pneumatic tire formed from the rubber composition.

Solution to Problem

As a result of diligent research into how to solve the aforementioned problem, the inventor of the present invention has found that a carbonate salt, a hydrogen carbonate salt or carbon dioxide, which is generated by the decomposition of these salts, promotes a hydrolysis reaction of an alkoxy group or the like, thereby improving the rate of reaction between a silane coupling agent and silica, and has thereby completed the present invention.

The present invention relates to a rubber composition for a tire, containing: diene rubber; silica; a silane coupling agent; and at least one of a carbonate salt and a hydrogen carbonate salt, wherein the rubber composition has a total content of the carbonate salt and the hydrogen carbonate salt of 0.3 to 25 parts by mass relative to 100 parts by mass of the silica.

Preferably, the carbonate salt is at least one selected from the group consisting of sodium carbonate, potassium carbonate, ammonium carbonate, lithium carbonate, calcium carbonate and magnesium carbonate, and the hydrogen carbonate salt is at least one selected from the group consisting of sodium hydrogen carbonate, potassium hydrogen carbonate and ammonium hydrogen carbonate.

Preferably, the carbonate salt is at least one selected from the group consisting of sodium carbonate, ammonium carbonate, lithium carbonate, calcium carbonate and magnesium carbonate, and the hydrogen carbonate salt is ammonium hydrogen carbonate.

Preferably, the potassium carbonate has an average particle size of 40 μm or smaller.

Preferably, the silane coupling agent is at least one selected from the group consisting of a sulfide-type silane coupling agent, a silane coupling agent represented by formula (1):

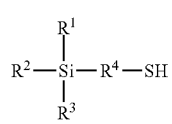

(1)

wherein $R^1$ is a group represented by $-O-(R^5-O)_m-R^6$ in which m pieces of $R^5$ are the same or different and each denote a branched or unbranched divalent hydrocarbon group having 1 to 30 carbon atoms, $R^6$ denotes a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms, and m is an integer between 1 and 30; $R^2$ and $R^3$ are the same or different and each denote a group as defined for $R^1$, a branched or unbranched alkyl group having 1 to 12 carbon atoms, or a group represented by $-O-R^7$ in which $R^7$ denotes a hydrogen atom, a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms; and $R^4$ denotes a branched or unbranched alkylene group having 1 to 30 carbon atoms, and a silane coupling agent containing linking units A and B respectively represented by formulae (2) and (3):

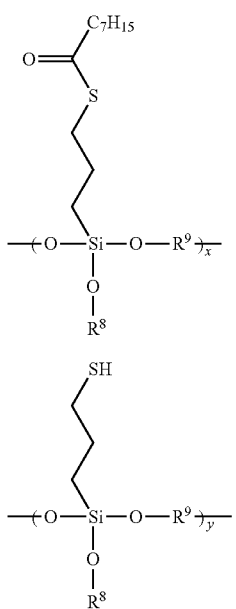

(2)

(3)

wherein x is an integer of 0 or higher; y is an integer of 1 or higher; $R^8$ denotes a hydrogen atom, a halogen atom, a branched or unbranched alkyl or alkylene group having 1 to 30 carbon atoms, a branched or unbranched alkenyl or alkenylene group having 2 to 30 carbon atoms, a branched or unbranched alkynyl or alkynylene group having 2 to 30 carbon atoms, or a group in which a terminal of the alkyl or alkenyl group is substituted with a hydroxyl or carboxyl group; $R^9$ denotes a hydrogen atom, a branched or unbranched alkylene or alkyl group having 1 to 30 carbon atoms, a branched or unbranched alkenylene or alkenyl group having 2 to 30 carbon atoms, or a branched or unbranched alkynylene or alkynyl group having 2 to 30 carbon atoms; and $R^8$ and $R^9$ may together form a ring structure.

Preferably, 5 to 150 parts by mass of the silica is contained relative to 100 parts by mass of the diene rubber, and 2 to 20 parts by mass of the silane coupling agent is contained relative to 100 parts by mass of the silica.

Preferably, the rubber composition for a tire is obtained by a production method including: a step (A) of kneading diene rubber, silica, a silane coupling agent, and at least one of a carbonate salt and a hydrogen carbonate salt, and discharging the resulting kneaded mixture A; a step (B) of kneading the kneaded mixture A discharged in the step (A), stearic acid and zinc oxide, and discharging the resulting kneaded mixture B; and a step (C) of kneading the kneaded mixture B discharged in the step (B), a vulcanizing agent and a vulcanization accelerator.

Preferably, the rubber composition for a tire is obtained by a production method including: a step (a) of kneading diene rubber, silica, a silane coupling agent, and at least one of a carbonate salt and a hydrogen carbonate salt, adding thereto stearic acid and zinc oxide, further kneading them, and discharging the resulting kneaded mixture a; and a step (b) of kneading the kneaded mixture a discharged in the step (a), a vulcanizing agent and a vulcanization accelerator.

The present invention also relates to a pneumatic tire formed from the rubber composition.

Advantageous Effects of Invention

According to the present invention, the rubber composition for a tire contains: diene rubber; silica; a silane coupling agent; and a predetermined amount of a carbonate salt and/or a hydrogen carbonate salt, and therefore has an increased rate of reaction between the silane coupling agent and silica so that its performances including fuel economy and abrasion resistance can be enhanced. Therefore, by using this rubber composition in various tire components, it is possible to provide pneumatic tires having excellent fuel economy and abrasion resistance.

DESCRIPTION OF EMBODIMENTS

The rubber composition for a tire of the present invention contains: diene rubber; silica; a silane coupling agent; and a predetermined amount of a carbonate salt and/or a hydrogen carbonate salt.

Rubbers able to be used as the diene rubber in the present invention are not particularly limited, and include natural rubber (NR), isoprene rubber (IR), butadiene rubber (BR), styrene-butadiene rubber (SBR), chloroprene rubber (CR), styrene-isoprene-butadiene rubber (SIBR), styrene-isoprene rubber (SIR) and isoprene-butadiene rubber. It is possible to use one type of diene rubber or a combination of two or more types thereof. Of these, SBR, NR, IR and BR are preferred because they can enhance the abrasion resistance so that good abrasion resistance, fuel economy and wet grip performance can be obtained. Also, using oil-free SBR (non-oil-extended SBR) can also lead to such an effect.

Examples of SBR able to be used include emulsion polymerized styrene-butadiene rubber (E-SBR) and solution polymerized styrene-butadiene rubber (S-SBR). Of these, S-SBR is preferred because it can enhance the abrasion resistance so that both this performance and fuel economy can be satisfied.

The bound styrene content in SBR is preferably 40% by mass or lower, more preferably 35% by mass or lower, further preferably 30% by mass or lower, and particularly preferably 28% by mass or lower. If the bound styrene content exceeds 40% by mass, the glass transition temperature (Tg) tends to increase and the abrasion resistance tends to deteriorate. Also, the bound styrene content in SBR is preferably 10% by mass or higher, more preferably 20% by mass or higher, and further preferably 24% by mass or higher. If the bound styrene content is less than 10% by mass, the Tg value may be too low and it may not be possible to achieve satisfactory wet grip performance.

Here, the styrene content can be calculated by $^1$H-NMR measurement.

The content of SBR is preferably 50% by mass or higher, and more preferably 60% by mass or higher, based on 100% by mass of the diene rubber. If the content is lower than 50% by mass, it may not be possible to achieve satisfactory wet grip performance. The content may be 100% by mass, but is preferably 90% by mass or lower, and more preferably 70% by mass or lower. If the content exceeds 90% by mass, the fuel economy may deteriorate.

Examples of NR able to be used include those commonly used in the tire industry, such as SIR20, RSS#3 and TSR20.

The content of NR is preferably 20% by mass or higher, and more preferably 30% by mass or higher, based on 100% by mass of the diene rubber. If the content is lower than 20% by mass, the rubber strength may deteriorate, which may cause separation of rubber pieces. The content is preferably 85% by mass or lower, more preferably 70% by mass or lower, further preferably 50% by mass or lower, and particularly preferably 40% by mass or lower. If the content exceeds 85% by mass, the wet grip performance may deteriorate.

Silica is used in the present invention. Compounding silica can lead to enhancement in wet grip performance and fuel economy and also improvement of abrasion resistance due to its reinforcing effect. The type of silica used is not particularly limited, and may be, for example, dry silica (silicic anhydride) or wet silica (hydrous silicic acid), but wet silica is preferred because it has a large amount of silanol groups.

The nitrogen adsorption specific surface area ($N_2SA$) of silica is preferably 40 $m^2/g$ or higher, more preferably 50 $m^2/g$ or higher, further preferably 100 $m^2/g$ or higher, and particularly preferably 150 $m^2/g$ or higher. If the nitrogen adsorption specific surface area is lower than 40 $m^2/g$, it may not be possible to achieve satisfactory abrasion resistance. Also, the $N_2SA$ of silica is preferably 220 $m^2/g$ or lower, and more preferably 200 $m^2/g$ or lower. If the $N_2SA$ exceeds 220 $m^2/g$, dispersion of the silica may be difficult so that dispersion problems may occur.

Here, the nitrogen adsorption specific surface area of silica is a value measured using the BET method in accordance with ASTM D3037-81.

The content of silica is preferably 5 parts by mass or higher, and more preferably 15 parts by mass or higher, relative to 100 parts by mass of the diene rubber. If the content is lower than 5 parts by mass, satisfactory rubber strength may not be obtained and the abrasion resistance may deteriorate. The content of silica is preferably 150 parts by mass or lower, and more preferably 120 parts by mass or lower. If the content exceeds 150 parts by mass, the silica dispersibility tends to deteriorate and the abrasion resistance tends to deteriorate.

A silane coupling agent is used in the present invention. Compounding a silane coupling agent brings about bonding between rubber and silica, thereby enhancing performance such as abrasion resistance.

The silane coupling agent is not particularly limited, and examples thereof include sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazole tetrasulfide, 3-triethoxysilylpropyl methacrylate monosulfide and 3-trimethoxysilylpropyl methacrylate monosulfide; mercapto-type silane coupling agents such as 3-mercaptopropyltrimethoxysilane, 3-mercaptopropyltriethoxysilane, 2-mercaptoethyltrimethoxysilane and 2-mercaptoethyltriethoxysilane; vinyl-type silane coupling agents such as vinyltriethoxysilane and vinyltrimethoxysilane; amino-type silane coupling agents such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy-type silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro-type silane coupling agents such as 3-nitropropyltrimethoxysilane and 3-nitropropyltriethoxysilane; and chlorine-type silane coupling agents such as 3-chloropropyltrimethoxysilane, 3-chloropropyltriethoxysilane, 2-chloroethyltrimethoxysilane and 2-chloroethyltriethoxysilane.

Of these, preferred are sulfide-type silane coupling agents (especially, bis(3-triethoxysilylpropyl)disulfide and bis(3-triethoxysilylpropyl)tetrasulfide), silane coupling agents represented by the following formula (1) and silane coupling agents containing linking units A represented by the following formula (2) and linking units B represented by the following formula (3) because they exhibit high rates of reaction with silica so that excellent abrasion resistance can be obtained.

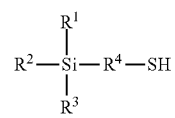

(1)

In formula (1), $R^1$ is a group represented by —O—$(R^5$—O$)_m$—$R^6$ in which m pieces of $R^5$ are the same or different and each denote a branched or unbranched divalent hydrocarbon group having 1 to 30 carbon atoms, $R^6$ denotes a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms, and m is an integer between 1 and 30; $R^2$ and $R^3$ are the same or different and each denote a group as defined for $R^1$, a branched or unbranched alkyl group having 1 to 12 carbon atoms, or a group represented by —O—$R^7$ in which $R^7$ denotes a hydrogen atom, a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms; and $R^4$ denotes a branched or unbranched alkylene group having 1 to 30 carbon atoms.

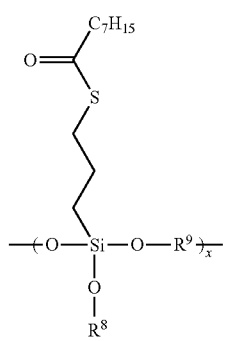

(2)

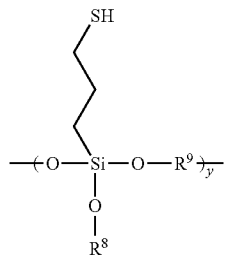
(3)

In formulae (2) and (3), x is an integer of 0 or higher; y is an integer of 1 or higher; $R^8$ denotes a hydrogen atom, a halogen atom, a branched or unbranched alkyl or alkylene group having 1 to 30 carbon atoms, a branched or unbranched alkenyl or alkenylene group having 2 to 30 carbon atoms, a branched or unbranched alkynyl or alkynylene group having 2 to 30 carbon atoms, or a group in which a terminal of the alkyl or alkenyl group is substituted with a hydroxyl or carboxyl group; $R^9$ denotes a hydrogen atom, a branched or unbranched alkylene or alkyl group having 1 to 30 carbon atoms, a branched or unbranched alkenylene or alkenyl group having 2 to 30 carbon atoms, or a branched or unbranched alkynylene or alkynyl group having 2 to 30 carbon atoms; and $R^8$ and $R^9$ may together form a ring structure.

By compounding the silane coupling agent represented by formula (1) above, it is possible to achieve excellent fuel economy and abrasion resistance.

In formula (1) above, $R^1$ is a group represented by —O—$(R^5$—O$)_m$—$R^6$ in which m pieces of $R^5$ are the same or different and each denote a branched or unbranched divalent hydrocarbon group having 1 to 30 carbon atoms, $R^6$ denotes a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms, and m is an integer between 1 and 30.

The $R^5$ groups are the same or different and each denote a branched or unbranched divalent hydrocarbon group having 1 to 30 carbon atoms (preferably 1 to 15 carbon atoms, and more preferably 1 to 3 carbon atoms). Examples of this hydrocarbon group include branched or unbranched alkylene groups having 1 to 30 carbon atoms, branched or unbranched alkenylene groups having 2 to 30 carbon atoms, branched or unbranched alkynylene groups having 2 to 30 carbon atoms and arylene groups having 6 to 30 carbon atoms. Of these, the alkylene groups are preferred because they can bond (react) readily with silica so that the fuel economy and abrasion resistance can be satisfactorily enhanced.

The branched or unbranched alkylene groups having 1 to 30 carbon atoms (preferably 1 to 15 carbon atoms, and more preferably 1 to 3 carbon atoms) of $R^5$ include, for example, a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group and an octadecylene group.

The branched or unbranched alkenylene groups having 2 to 30 carbon atoms (preferably 2 to 15 carbon atoms, and more preferably 2 to 3 carbon atoms) of $R^5$ include, for example, a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group and a 1-octenylene group.

The branched or unbranched alkynylene groups having 2 to 30 carbon atoms (preferably 2 to 15 carbon atoms, and more preferably 2 to 3 carbon atoms) of $R^5$ include, for example, an ethynylene group, a propynylene group, a butynylene group, a pentynylene group, a hexynylene group, a heptynylene group, an octynylene group, a nonynylene group, a decynylene group, an undecynylene group and a dodecynylene group.

The arylene groups having 6 to 30 carbon atoms (preferably 6 to 15 carbon atoms) of $R^5$ include, for example, a phenylene group, a tolylene group, a xylylene group and a naphthylene group.

The m denotes an integer between 1 and 30 (preferably between 2 and 20, more preferably between 3 and 7, and further preferably between 5 and 6). If m is 0, the bonding (reaction) with silica is adversely affected, whereas if m is 31 or higher, the reactivity with silica decreases, which is disadvantageous from the perspective of the process.

$R^6$ denotes a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms. Among these, $R^6$ is preferably a branched or unbranched alkyl group having 1 to 30 carbon atoms because it leads to good reactivity with silica.

Examples of the branched or unbranched alkyl group having 1 to 30 carbon atoms (preferably 3 to 25 carbon atoms, and more preferably 10 to 15 carbon atoms) of $R^6$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group and an octadecyl group.

Examples of the branched or unbranched alkenyl group having 2 to 30 carbon atoms (preferably 3 to 25 carbon atoms, and more preferably 10 to 15 carbon atoms) of $R^6$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, a 1-octenyl group, a decenyl group, an undecenyl group, a dodecenyl group, a tridecenyl group, a tetradecenyl group, a pentadecenyl group and an octadecenyl group.

Examples of the aryl group having 6 to 30 carbon atoms (preferably 10 to 20 carbon atoms) of $R^6$ include a phenyl group, a tolyl group, a xylyl group, a naphthyl group and a biphenyl group.

Examples of the aralkyl group having 7 to 30 carbon atoms (preferably 10 to 20 carbon atoms) of $R^6$ include a benzyl group and a phenethyl group.

Specific examples of $R^1$ in formula (1) above include —O—$(C_2H_4$—O$)_5$—$C_{11}H_{23}$, —O—$(C_2H_4$—O$)_5$—$C_{12}H_{25}$, —O—$(C_2H_4$—O$)_5C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$ and —O—$(C_2H_4$—O$)_7$—$C_{13}H_{27}$. Of these, —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$ and —O—$(C_2H_4$—O$)_6$—$C_{13}H_{27}$ are preferred.

$R^2$ and $R^3$ are the same or different and each denote a group as defined for $R^1$ (that is, a group represented by —O—$(R^5$—O$)_m$—$R^6$), a branched or unbranched alkyl group having 1 to 12 carbon atoms, or a group represented by —O—$R^7$ in which $R^7$ denotes a hydrogen atom, a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms. Among these, $R^2$ and $R^3$ each are preferably a group as defined for $R^1$ or a group represented by —O—$R^7$ in which $R^7$ denotes a branched or unbranched alkyl group having 1 to 30 carbon atoms because they exhibit good reactivity with silica.

Examples of the branched or unbranched alkyl group having 1 to 12 carbon atoms (preferably 1 to 8 carbon atoms, and more preferably 1 to 5 carbon atoms) for $R^2$ and $R^3$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group and a nonyl group.

Examples of the branched or unbranched alkyl group having 1 to 30 carbon atoms (preferably 1 to 15 carbon atoms, and more preferably 1 to 3 carbon atoms) of $R^7$ include the same groups as mentioned as the branched or unbranched alkyl group having 1 to 30 carbon atoms of $R^6$.

Examples of the branched or unbranched alkenyl group having 2 to 30 carbon atoms of $R^7$ include the same groups as mentioned as the branched or unbranched alkenyl group having 2 to 30 carbon atoms of $R^6$.

Examples of the aryl group having 6 to 30 carbon atoms of $R^7$ include the same groups as mentioned as the aryl group having 6 to 30 carbon atoms of $R^6$.

Examples of the aralkyl group having 7 to 30 carbon atoms of $R^7$ include the same groups as mentioned as the aralkyl group having 7 to 30 carbon atoms of $R^6$.

Specific examples of $R^2$ and $R^3$ in formula (1) above include —O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2$—O—$)_5$—$C_{14}H_{29}$, —O—$(C_2H_4$—O$)_5$—$C_{15}H_{31}$, —O—$(C_2H_4$—$C_{13}H_{27}$, —O—$(C_2H_4$—O$)_4$—$C_{13}H_{27}$, —O—$(C_2H_4$—O$)_6$—$C_{13}H_{27}$, —O—$(C_2H_4$—O$)_7$—$C_{13}H_{27}$, $C_2H_5$—O—, $CH_3$—O— and $C_3H_7$—O—. Of these, —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$, —O—$C_2H_4$—O$)_6$—$C_{13}H_{27}$ and $C_2H_5$—O— are preferred.

Examples of the branched or unbranched alkylene group having 1 to 30 carbon atoms (preferably 1 to 10 carbon atoms, and more preferably 1 to 5 carbon atoms) of $R^4$ include the same groups as mentioned as the branched or unbranched alkylene group having 1 to 30 carbon atoms of $R^5$.

The silane coupling agent represented by formula (1) above may be, for example, Si363 produced by Degussa. It is possible to use one of such silane coupling agents or a combination of two or more thereof.

Also, by compounding a silane coupling agent containing linking units B represented by formula (3) above and optionally linking units A represented by formula (2) above, it is possible to enhance the fuel economy and abrasion resistance compared with a case in which a conventional silane coupling agent, such as bis(3-triethoxysilylpropyptetrasulfide, is used.

The silane coupling agent containing linking units A and B is preferably a copolymer in which the proportion of linking units B is 1 to 70 mol % of the total molar amount of linking units A and B.

If the molar ratio of linking units A and B satisfies this condition, an increase in viscosity during processing can be suppressed compared with cases in which polysulfide silanes such as bis(3-triethoxysilylpropyl)tetrasulfide are used. This is thought to be because the sulfide moiety in linking unit A is a C—S—C bond and is therefore more thermally stable than tetrasulfide or disulfide, which leads to less increase in Mooney viscosity.

Also, if the molar ratio of linking units A and B satisfies the condition, a reduction in scorch time can be suppressed compared with cases in which mercaptosilanes such as 3-mercaptopropyltrimethoxysilane are used. This is thought to be because although linking unit B has a mercaptosilane structure, the —$C_7H_{15}$ moiety in linking unit A covers the —SH group in linking unit B, and the silane coupling agent is therefore less likely to react with the polymer, which leads to less scorching.

The halogen atom of $R^8$ may be chlorine, bromine, fluorine or the like.

Examples of the branched or unbranched alkyl groups having 1 to 30 carbon atoms (preferably 1 to 12 carbon atoms, and more preferably 1 to 5 carbon atoms) for $R^8$ and $R^9$ include the same groups as mentioned as the branched or unbranched alkyl group having 1 to 30 carbon atoms of $R^6$.

Examples of the branched or unbranched alkylene groups having 1 to 30 carbon atoms (preferably 1 to 12 carbon atoms) for $R^8$ and $R^9$ include the same groups as mentioned as the branched or unbranched alkylene group having 1 to 30 carbon atoms of $R^5$.

Examples of the branched or unbranched alkenyl groups having 2 to 30 carbon atoms (preferably 2 to 12 carbon atoms) for $R^8$ and $R^9$ include the same groups as mentioned as the branched or unbranched alkenyl group having 2 to 30 carbon atoms of $R^6$.

Examples of the branched or unbranched alkenylene groups having 2 to 30 carbon atoms (preferably 2 to 12 carbon atoms) for $R^8$ and $R^9$ include the same groups as mentioned as the branched or unbranched alkenylene group having 2 to 30 carbon atoms of $R^5$.

Examples of the branched or unbranched alkynyl groups having 2 to 30 carbon atoms (preferably 2 to 12 carbon atoms) for $R^8$ and $R^9$ include an ethynyl group, a propynyl group, a butynyl group, a pentynyl group, a hexynyl group, a heptynyl group, an octynyl group, a nonynyl group, a decynyl group, an undecynyl group and a dodecynyl group.

Examples of the branched or unbranched alkynylene groups having 2 to 30 carbon atoms (preferably 2 to 12 carbon atoms) for $R^8$ and $R^9$ include the same groups as mentioned as the branched or unbranched alkynylene group having 2 to 30 carbon atoms of $R^5$.

In the silane coupling agent containing linking units A and B, the total number of repetitions (x+y) of the number of repetitions (x) of linking unit A and the number of repetitions (y) of linking unit B is preferably in the range of 3 to 300. If x+y is in this range and x is 1 or higher, the —$C_7H_{15}$ moiety in linking unit A covers the mercaptosilane in linking unit B, and it is therefore possible to suppress a reduction in scorch time and to ensure good reactivity with silica and with the rubber component.

Examples of the silane coupling agent containing linking units A and B include NXT-Z30, NXT-Z45, NXT-Z60 and NXT-Z100 all of which are produced by Momentive. It is possible to use one of such silane coupling agents or a combination of two or more thereof.

The content of the silane coupling agent is preferably 2 parts by mass or higher, more preferably 4 parts by mass or higher, and further preferably 6 parts by mass or higher, relative to 100 parts by mass of the silica. If the content is lower than 2 parts by mass, it tends not be possible to produce a satisfactory effect to enhance the fuel economy.

Also, the content of the silane coupling agent is preferably 20 parts by mass or lower, more preferably 15 parts by mass or lower, and further preferably 10 parts by mass or lower. If the content exceeds 20 parts by mass, the fuel economy and abrasion resistance tend to fail to be improved with increase in the content and therefore costs tend to increase.

In cases where two or more silane coupling agents are used in combination, the content means the total content of the silane coupling agents.

At least one compound selected from the group consisting of carbonate salts and hydrogen carbonate salts is compounded in the present invention. This promotes a hydrolysis reaction of an alkoxy group or the like in the silane coupling agent and therefore a hydrolysis reaction of an alkoxy group or the like will proceed sufficiently (that is, silanol groups will be sufficiently produced) in the rubber composition kneading step, which can lead to an increased rate of reaction between the silane coupling agent and silica. Therefore, the fuel economy and abrasion resistance of the resulting rubber composition (pneumatic tire) can be enhanced.

Suitable carbonate salts and hydrogen carbonate salts are inorganic carbonate salts and inorganic hydrogen carbonate salts from the perspective of increasing the rate of reaction between the silane coupling agent and silica. Examples of the inorganic carbonate salts include alkali metal carbonates such as sodium carbonate, potassium carbonate and lithium carbonate; ammonium carbonate; and alkaline earth metal carbonates such as calcium carbonate and magnesium carbonate. Examples of the inorganic hydrogen carbonate salts include alkali metal hydrogen carbonates such as sodium hydrogen carbonate, potassium hydrogen carbonate and lithium hydrogen carbonate; ammonium hydrogen carbonate; and alkaline earth metal hydrogen carbonates such as calcium hydrogen carbonate and magnesium hydrogen carbonate. Of these, sodium carbonate, potassium carbonate, ammonium carbonate, lithium carbonate, calcium carbonate, magnesium carbonate, sodium hydrogen carbonate, potassium hydrogen carbonate and ammonium hydrogen carbonate are preferred, and sodium carbonate, potassium carbonate, ammonium carbonate, sodium hydrogen carbonate, potassium hydrogen carbonate and ammonium hydrogen carbonate are more preferred, in terms of effectively increasing the reaction rate. In particular, ammonium hydrogen carbonate is very suitable because it has a lower melting temperature than metal salts and will decompose into carbon dioxide, ammonia and water, which will then vaporize, in a base kneading step, so that no adverse effect is caused on vulcanization in a final kneading step and therefore good vulcanization is ensured. Here, because ammonium hydrogen carbonate has a low decomposition temperature and some amount will vaporize in the step, it needs to be added in an amount somewhat larger than those of other inorganic carbonate salts and inorganic hydrogen carbonate salts.

Meanwhile, potassium carbonate having an average particle size of 40 μm or smaller is preferably used. The average particle size is more preferably 30 μm or smaller, and further preferably 20 μm or smaller. If the average particle size exceeds 40 μm, fracture nuclei tend to be formed due to poor dispersion of the potassium carbonate, in other words, foreign matter contaminates the rubber composition, and therefore breakage of the rubber composition tends to occur around foreign matter particles, thereby leading to poor abrasion resistance. Also, the lower limit of the average particle size is not particularly limited, but is preferably 3 μm or greater, and more preferably 5 μm or greater.

The average particle size of potassium carbonate herein is a value measured using a laser diffraction/scattering particle size distribution analyzer (LA-910 manufactured by Horiba, Ltd.).

The total content of the carbonate salt and the hydrogen carbonate salt is 0.3 parts by mass or higher, preferably 0.5 parts by mass or higher, more preferably 1 part by mass or higher, and further preferably 2 parts by mass or higher, relative to 100 parts by mass of the silica. If the total content is lower than 0.3 parts by mass, the rate of reaction between the silane coupling agent and silica tends not to be increased sufficiently, thereby failing to enhance the fuel economy and abrasion resistance. The total content is 25 parts by mass or lower, preferably 20 parts by mass or lower, more preferably 10 parts by mass or lower, and further preferably 6 parts by mass or lower. If the total content exceeds 25 parts by mass, the content of the carbonate salt and hydrogen carbonate salt is so high that the rolling resistance tends to increase to reduce the fuel economy.

In addition to the aforementioned components, compounding ingredients commonly used in the production of rubber compositions, such as carbon black, stearic acid, antioxidants, antiozonants, oil, wax, vulcanizing agents and vulcanization accelerators, may be compounded as appropriate in the rubber composition of the present invention.

Usable antioxidants include amine antioxidants, for example, diphenylamine derivatives such as p-(p-toluenesulfonylamide)-diphenylamine; and p-phenylenediamine derivatives such as N-(1,3-dimethylbutyl)-N'-phenyl-p-phenylenediamine (6PPD) and N-phenyl-N'-isopropyl-p-phenylenediamine (IPPD).

In the rubber composition of the present invention, the content of the antioxidant is preferably 5 parts by mass or lower, more preferably 4 parts by mass or lower, and further preferably 3 parts by mass or lower, relative to 100 parts by mass of the diene rubber.

The rubber composition of the present invention can be produced using an ordinary method. Specifically, the rubber composition can be produced by, for example, kneading the aforementioned components in a Banbury mixer, a kneader, an open roll mill or the like, and then vulcanizing the mixture. In particular, Production Methods 1 and 2 mentioned below are preferred and Production Method 1 is more preferred because firstly kneading the rubber component, the silica, the silane coupling agent and the carbonate salt and/or hydrogen carbonate salt can lead to an increased rate of reaction between the silane coupling agent and silica and therefore excellent fuel economy and abrasion resistance.

(Production Method 1)

A production method that includes: a step (A) of kneading diene rubber, silica, a silane coupling agent, and a carbonate salt and/or a hydrogen carbonate salt, and discharging the resulting kneaded mixture A; a step (B) of kneading the kneaded mixture A discharged in the step (A), stearic acid and zinc oxide, and discharging the resulting kneaded mixture B; and a step (C) of kneading the kneaded mixture B discharged in the step (B), a vulcanizing agent and a vulcanization accelerator.

(Production Method 2)

A production method that includes: a step (a) of kneading diene rubber, silica, a silane coupling agent, and a carbonate salt and/or a hydrogen carbonate salt, adding thereto stearic acid and zinc oxide, further kneading them, and discharging the resulting kneaded mixture a; and a step (b) of kneading the kneaded mixture a discharged in the step (a), a vulcanizing agent and a vulcanization accelerator.

The kneading processes in the steps in Production Methods 1 and 2 can be carried out using a conventionally known kneading machine and the kneading temperature and time may be set as appropriate. With regard to the kneading temperature in particular, the kneading temperature in the steps (A) and (B) and the kneading temperature in the step (a) (the temperature at which diene rubber, silica, a silane coupling agent, and a carbonate salt and/or a hydrogen carbonate salt are kneaded and the temperature at which stearic acid and zinc oxide are added and further kneaded) each are preferably in the range of 120 to 160° C. Also, the kneading temperature in the steps (C) and (b) is preferably in the range of 70 to 120° C.

Oil, carbon black, an antioxidant, wax and the like may also be kneaded in the kneading process in the step (A) of Production Method 1. Here, it is preferable to knead oil together in this kneading process because the load on the kneading machine can be reduced. Also, an antioxidant, wax and the like may also be kneaded in the kneading process in the step (B).

Meanwhile, oil, carbon black, an antioxidant, wax and the like may also be kneaded in the kneading process in the step (a) of Production Method 2. Also, it is preferable to knead oil together in this kneading process for the same reason as that given above.

The kneading process in the steps (C) and (b) in Production Methods 1 and 2 is carried out, and then the resulting kneaded mixture (unvulcanized rubber composition) is vulcanized for 5 to 40 minutes at 140 to 185° C., whereby a vulcanized rubber composition can be obtained.

By using Production Method 1 or 2, it is possible to increase the rate of reaction between the silica and the silane coupling agent and thereby reduce the amount of unreacted silane coupling agent to 15% by mass or lower (preferably to 10% by mass or lower).

The amount of unreacted silane coupling agent can be measured using the method mentioned in examples given below.

The rubber composition of the present invention can be suitably used in various tire components. In particular, the rubber composition of the present invention is preferably used in treads (cap treads and base treads), sidewalls and clinches for which fuel economy, abrasion resistance and other performances are required.

The pneumatic tire of the present invention can be produced from the rubber composition by an ordinary method. Specifically, an unvulcanized rubber composition with the aforementioned components compounded therein is extruded and processed into the shape of a tread or the like and then molded with other tire components in a tire building machine by an ordinary method to form an unvulcanized tire. A tire is obtained by heating and pressurizing this unvulcanized tire in a vulcanizer.

The pneumatic tire of the present invention can be suitably used as automotive tires, bus tires, truck tires and the like.

EXAMPLES

The present invention will now be explained in greater detail, referring to examples, but is in no way limited to these examples.

An explanation of the various chemicals used in the examples will now be given.

SBR: SBR Nipol NS210 produced by Zeon Corporation (bound styrene content: 25% by mass, Mooney viscosity ($ML_{1+4}$, 100° C.): 56)
NR: RSS#3
Carbon black: Diablack I produced by Mitsubishi Chemical Corporation
Silica: Ultrasil VN3 produced by Degussa ($N_2SA$: 175 $m^2/g$)
Silane coupling agent (1): Si266 (bis(3-triethoxysilylpropyl) disulfide) produced by Degussa
Silane coupling agent (2): Si363 produced by Degussa (silane coupling agent represented by formula below (in formula (1) above, $R^1 = -O-(C_2H_4-O)_5-C_{13}H_{27}$, $R^2 = C_2H_5-O-$, $R^3 = -O-(C_2H_4-O)_5-C_{13}H_{27}$, $R^4 = -C_3H_6-$))

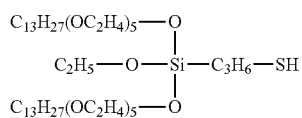

Silane coupling agent (3): NXT-Z45 produced by Momentive (copolymer of linking units A and B, linking unit A: 55 mol %, linking unit B: 45 mol %)
Aromatic oil: X140 produced by Jomo
Stearic acid: stearic acid beads "Tsubaki" produced by NOF Corporation
Zinc oxide: zinc oxide #2 produced by Mitsui Mining & Smelting Co., Ltd.
Sulfur: sulfur (200 meshes) produced by Tsurumi Chemical Industry Co., Ltd.
Vulcanization accelerator TBBS: Nocceler NS produced by Ouchi Shinko Chemical Industrial Co., Ltd.
Vulcanization accelerator DPG: Nocceler D produced by Ouchi Shinko Chemical Industrial Co., Ltd.
Sodium carbonate: produced by Wako Pure Chemical Industries, Ltd.
Potassium carbonate (1): produced by Wako Pure Chemical Industries, Ltd. (average particle size: 340 μm as measured using a laser diffraction/scattering particle size distribution analyzer (LA-910 manufactured by Horiba, Ltd.))
Potassium carbonate (2): produced by Asahi Glass Co., Ltd. (average particle size: 21 μm as measured described above)
Ammonium carbonate: produced by Wako Pure Chemical Industries, Ltd.
Lithium carbonate: produced by Wako Pure Chemical Industries, Ltd.
Calcium carbonate: produced by Wako Pure Chemical Industries, Ltd.
Magnesium carbonate: produced by Wako Pure Chemical Industries, Ltd.
Potassium hydrogen carbonate: produced by Wako Pure Chemical Industries, Ltd.
Sodium hydrogen carbonate: produced by Wako Pure Chemical Industries, Ltd.
Ammonium hydrogen carbonate: produced by Nissei Corporation

EXAMPLES AND COMPARATIVE EXAMPLES (Preparation of Rubber Test Pieces)

Production Example 1: Examples 1 to 50 and Comparative Examples 1 to 21 (Production Method 1)

100 parts by mass of SBR, 55 parts by mass of silica, 20 parts by mass of carbon black, 10 parts by mass of aromatic oil, and 4.4 parts by mass of silane coupling agent (1) were kneaded with various amounts of carbonate or hydrogen carbonate salts (relative to 100 parts by mass of the silica) shown in Table 1 in a 1.7 L Banbury mixer, followed by discharging when the kneading temperature was 150° C. Thus kneaded mixtures 1 were obtained.

Next, 2 parts by mass of stearic acid and 3 parts by mass of zinc oxide were kneaded with each kneaded mixture 1 in a 1.7 L Banbury mixer, followed by discharging when the kneading temperature was 130° C. Thus kneaded mixtures 2 were obtained.

Further, 1.5 parts by mass of sulfur, 1 part by mass of vulcanization accelerator TBBS and 0.5 parts by mass of vulcanization accelerator DPG were kneaded with each kneaded mixture 2 by a roller to give an unvulcanized rubber sheet (unvulcanized rubber composition).

The obtained unvulcanized rubber composition was press-vulcanized for 20 minutes at 170° C. to give a vulcanized rubber composition.

Production Example 2: Examples 51 to 70 and Comparative Examples 22 to 30 (Production Method 2)

100 parts by mass of SBR, 55 parts by mass of silica, 20 parts by mass of carbon black, 10 parts by mass of aromatic oil, and 4.4 parts by mass of silane coupling agent (1) were kneaded with various amounts of carbonate or hydrogen carbonate salts (relative to 100 parts by mass of the silica) shown in Table 2 in a 1.7 L Banbury mixer, and then 2 parts by mass of stearic acid and 3 parts by mass of zinc oxide were kneaded therewith, followed by discharging when the kneading temperature was 150° C. Thus kneaded mixtures 1 were obtained.

Further, 1.5 parts by mass of sulfur, 1 part by mass of vulcanization accelerator TBBS and 0.5 parts by mass of vulcanization accelerator DPG were kneaded with each kneaded mixture 1 by a roller to give an unvulcanized rubber sheet (unvulcanized rubber composition).

The obtained unvulcanized rubber composition was press-vulcanized for 20 minutes at 170° C. to give a vulcanized rubber composition.

Production Example 3: Examples 71 to 90 and Comparative Examples 31 to 39 (Production Method 3)

100 parts by mass of SBR, 55 parts by mass of silica, 20 parts by mass of carbon black, 10 parts by mass of aromatic oil, 4.4 parts by mass of silane coupling agent (1), 2 parts by mass of stearic acid, and 3 parts by mass of zinc oxide were kneaded with various amounts of carbonate or hydrogen carbonate salts (relative to 100 parts by mass of the silica) shown in Table 3 in a 1.7 L Banbury mixer, followed by discharging when the kneading temperature was 150° C. Thus kneaded mixtures 1 were obtained.

Further, 1.5 parts by mass of sulfur, 1 part by mass of vulcanization accelerator TBBS and 0.5 parts by mass of vulcanization accelerator DPG were kneaded with each kneaded mixture 1 by a roller to give an unvulcanized rubber sheet (unvulcanized rubber composition).

The obtained unvulcanized rubber composition was press-vulcanized for 20 minutes at 170° C. to give a vulcanized rubber composition.

Production Example 4: Examples 91 to 110 and Comparative Examples 40 to 48 (Production Method 1)

Unvulcanized rubber compositions and vulcanized rubber compositions were obtained in the same way as in Production Example 1, except that 6.6 parts by mass of silane coupling agent (2) was used instead of 4.4 parts by mass of silane coupling agent (1) and various carbonate or hydrogen carbonate salts were used in amounts shown in Table 4.

Production Example 5: Examples 111 to 130 and Comparative Examples 49 to 57 (Production Method 2)

Unvulcanized rubber compositions and vulcanized rubber compositions were obtained in the same way as in Production Example 2, except that 6.6 parts by mass of silane coupling agent (2) was used instead of 4.4 parts by mass of silane coupling agent (1) and various carbonate or hydrogen carbonate salts were used in amounts shown in Table 5.

Production Example 6: Examples 131 to 150 and Comparative Examples 58 to 66 (Production Method 1)

Unvulcanized rubber compositions and vulcanized rubber compositions were obtained in the same way as in Production Example 1, except that 4.4 parts by mass of silane coupling agent (3) was used instead of 4.4 parts by mass of silane coupling agent (1) and various carbonate or hydrogen carbonate salts were used in amounts shown in Table 6.

Production Example 7: Examples 151 to 170 and Comparative Examples 67 to 75 (Production Method 2)

Unvulcanized rubber compositions and vulcanized rubber compositions were obtained in the same way as in Production Example 2, except that 4.4 parts by mass of silane coupling agent (3) was used instead of 4.4 parts by mass of silane coupling agent (1) and various carbonate or hydrogen carbonate salts were used in amounts shown in Table 7.

Production Example 8: Examples 171 to 220 and Comparative Examples 76 to 96 (Production Method 1)

Unvulcanized rubber compositions and vulcanized rubber compositions were obtained in the same way as in Production Example 1, except that the rubber component was changed to include 70 parts by mass of SBR and 30 parts by mass of NR and various carbonate or hydrogen carbonate salts were used in amounts shown in Table 8.

Production Example 9: Examples 221 to 240 and Comparative Examples 97 to 105 (Production Method 1)

Unvulcanized rubber compositions and vulcanized rubber compositions were obtained in the same way as in Production Example 1, except that the rubber component was changed to include 70 parts by mass of SBR and 30 parts by mass of NR, 6.6 parts by mass of silane coupling agent (2) was used instead of 4.4 parts by mass of silane coupling agent (1), and various carbonate or hydrogen carbonate salts were used in amounts shown in Table 9.

Production Example 10: Examples 241 to 260 and Comparative Examples 106 to 114 (Production Method 1)

Unvulcanized rubber compositions and vulcanized rubber compositions were obtained in the same way as in Production Example 1, except that the rubber component was changed to include 70 parts by mass of SBR and 30 parts by mass of NR, 4.4 parts by mass of silane coupling agent (3) was used instead of 4.4 parts by mass of silane coupling agent (1), and various carbonate or hydrogen carbonate salts were used in amounts shown in Table 10.

Production Example 11: Examples 261 to 310 and Comparative Examples 115 to 135 (Production Method 2)

Unvulcanized rubber compositions and vulcanized rubber compositions were obtained in the same way as in Production Example 2, except that the rubber component was changed to include 70 parts by mass of SBR and 30 parts by mass of NR and various carbonate or hydrogen carbonate salts were used in amounts shown in Table 11.

Production Example 12: Examples 311 to 330 and Comparative Examples 136 to 144 (Production Method 2)

Unvulcanized rubber compositions and vulcanized rubber compositions were obtained in the same way as in Production Example 2, except that the rubber component was changed to include 70 parts by mass of SBR and 30 parts by mass of NR, 6.6 parts by mass of silane coupling agent (2) was used instead of 4.4 parts by mass of silane coupling agent (1), and various carbonate or hydrogen carbonate salts were used in amounts shown in Table 12.

Production Example 13: Examples 331 to 350 and Comparative Examples 145 to 153 (Production Method 2)

Unvulcanized rubber compositions and vulcanized rubber compositions were obtained in the same way as in Production Example 2, except that the rubber component was changed to include 70 parts by mass of SBR and 30 parts by mass of NR, 4.4 parts by mass of silane coupling agent (3) was used instead of 4.4 parts by mass of silane coupling agent (1), and various carbonate or hydrogen carbonate salts were used in amounts shown in Table 13.

The obtained unvulcanized rubber compositions and vulcanized rubber compositions were evaluated as follows. The results are shown in Tables 1 to 13.

(Amount of Unreacted Coupling Agent)

An unvulcanized rubber sheet was finely cut and subjected to extraction with ethanol for 24 hours. The amount of unreacted silane coupling agent in the resultant extract was measured by gas chromatography, and the amount (wt %) of unreacted silane coupling agent was calculated based on the charged amount of the silane coupling agent.

A smaller value for this content means that a smaller amount of the silane coupling agent exists in an unreacted state in the unvulcanized rubber composition after completion of kneading. In other words, this indicates that a composition in which the silane coupling agent has reacted sufficiently during the kneading has a small amount of unreacted silane coupling agent and is therefore good.

(Abrasion Index)

Using a Lambourn abrasion tester, the loss in volume of each vulcanized rubber composition was measured for a test period of 3 minutes under a load of 2.5 kgf at a slip ratio of 40%. With the loss in volume of Comparative Example 1 deemed to be 100 (abrasion index), abrasion indices of the examples were calculated using the following calculation formula. A higher abrasion index means better abrasion resistance.

(Abrasion index of each example)=(loss in volume of Comparative Example 1)/(loss in volume of each example)×100

(Rolling Resistance Index)

Using a VES viscoelasticity spectrometer manufactured by Iwamoto Seisakusho Co., Ltd., the tan δ of each vulcanized rubber composition was measured at 70° C. under conditions of initial strain 10% and dynamic strain 2%. With the tan δ value of Comparative Example 1 deemed to be 100 (rolling resistance index), rolling resistance indices of the examples were calculated using the following calculation formula. A higher index means better performance in terms of rolling resistance.

(Rolling resistance index of each example)=(tan δ value of Comparative Example 1)/(tan δ value of each example)×100

TABLE 1

Rubber component: SBR 100 parts by mass
(Production Example 1: Production Method 1 (Si266))

| | | Comparative Example 1 | Comparative Example 2 | Example 1 | Example 2 | Example 3 | Example 4 | Example 5 | Comparative Example 3 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 18.4 | 14.6 | 5.5 | 0.5 | 0 | 0 | 0 | 0 |
| | Abrasion index | 100 | 99 | 102 | 105 | 108 | 106 | 104 | 95 |
| | Rolling resistance index | 100 | 100 | 102 | 106 | 112 | 108 | 105 | 100 |

TABLE 1-continued

Rubber component: SBR 100 parts by mass
(Production Example 1: Production Method 1 (Si266))

|  |  | Comparative Example 1 | Comparative Example 4 | Example 6 | Example 7 | Example 8 | Example 9 | Example 10 | Comparative Example 5 |
|---|---|---|---|---|---|---|---|---|---|
| Formulation Evaluation | Potassium carbonate (2) | — | 0.2 | 0.5 | 1 | 2 | 5 | 10 | 30 |
|  | Amount of unreacted coupling agent | 18.4 | 14.3 | 0.7 | 0 | 0 | 0 | 0 | 0 |
|  | Abrasion index | 100 | 100 | 103 | 105 | 110 | 108 | 106 | 98 |
|  | Rolling resistance index | 100 | 100 | 108 | 112 | 114 | 111 | 108 | 101 |

|  |  | Comparative Example 1 | Comparative Example 6 | Example 11 | Example 12 | Example 13 | Example 14 | Example 15 | Comparative Example 7 |
|---|---|---|---|---|---|---|---|---|---|
| Formulation Evaluation | Ammonium carbonate | — | 0.2 | 0.5 | 1 | 5 | 10 | 20 | 30 |
|  | Amount of unreacted coupling agent | 18.4 | 16.8 | 8.1 | 2.5 | 0 | 0 | 0 | 0 |
|  | Abrasion index | 100 | 99 | 106 | 108 | 112 | 110 | 105 | 94 |
|  | Rolling resistance index | 100 | 101 | 105 | 112 | 114 | 110 | 104 | 101 |

|  |  | Comparative Example 1 | Comparative Example 8 | Example 16 | Example 17 | Example 18 | Example 19 | Example 20 | Comparative Example 9 |
|---|---|---|---|---|---|---|---|---|---|
| Formulation Evaluation | Lithium carbonate | — | 0.2 | 0.5 | 1 | 5 | 10 | 20 | 30 |
|  | Amount of unreacted coupling agent | 18.4 | 15.3 | 3.7 | 0.5 | 0 | 0 | 0 | 0 |
|  | Abrasion index | 100 | 99 | 103 | 105 | 108 | 103 | 102 | 97 |
|  | Rolling resistance index | 100 | 101 | 102 | 105 | 110 | 106 | 105 | 102 |

|  |  | Comparative Example 1 | Comparative Example 10 | Example 21 | Example 22 | Example 23 | Example 24 | Example 25 | Comparative Example 11 |
|---|---|---|---|---|---|---|---|---|---|
| Formulation Evaluation | Calcium carbonate | — | 0.2 | 0.5 | 1 | 5 | 10 | 20 | 30 |
|  | Amount of unreacted coupling agent | 18.4 | 17.8 | 8.8 | 4.3 | 2 | 0 | 0 | 0 |
|  | Abrasion index | 100 | 100 | 102 | 104 | 105 | 106 | 105 | 97 |
|  | Rolling resistance index | 100 | 99 | 101 | 102 | 108 | 112 | 105 | 102 |

|  |  | Comparative Example 1 | Comparative Example 12 | Example 26 | Example 27 | Example 28 | Example 29 | Example 30 | Comparative Example 13 |
|---|---|---|---|---|---|---|---|---|---|
| Formulation Evaluation | Magnesium carbonate | — | 0.2 | 0.5 | 1 | 5 | 10 | 20 | 30 |
|  | Amount of unreacted coupling agent | 18.4 | 16.9 | 8.4 | 3.6 | 0.2 | 0 | 0 | 0 |
|  | Abrasion index | 100 | 100 | 102 | 105 | 105 | 104 | 104 | 97 |
|  | Rolling resistance index | 100 | 99 | 102 | 104 | 110 | 108 | 102 | 100 |

|  |  | Comparative Example 1 | Comparative Example 14 | Example 31 | Example 32 | Example 33 | Example 34 | Example 35 | Comparative Example 15 |
|---|---|---|---|---|---|---|---|---|---|
| Formulation Evaluation | Potassium hydrogen carbonate | — | 0.2 | 0.5 | 1 | 5 | 10 | 20 | 30 |
|  | Amount of unreacted coupling agent | 18.4 | 14.3 | 2 | 0 | 0 | 0 | 0 | 0 |
|  | Abrasion index | 100 | 100 | 102 | 106 | 109 | 108 | 103 | 97 |
|  | Rolling resistance index | 100 | 99 | 101 | 101 | 105 | 107 | 104 | 101 |

|  |  | Comparative Example 1 | Comparative Example 16 | Example 36 | Example 37 | Example 38 | Example 39 | Example 40 | Comparative Example 17 |
|---|---|---|---|---|---|---|---|---|---|
| Formulation Evaluation | Sodium hydrogen carbonate | — | 0.2 | 0.5 | 1 | 5 | 10 | 20 | 30 |
|  | Amount of unreacted coupling agent | 18.4 | 14 | 1.7 | 0 | 0 | 0 | 0 | 0 |
|  | Abrasion index | 100 | 100 | 102 | 104 | 107 | 105 | 103 | 97 |
|  | Rolling resistance index | 100 | 99 | 101 | 102 | 105 | 108 | 102 | 100 |

|  |  | Comparative Example 1 | Comparative Example 18 | Example 41 | Example 42 | Example 43 | Example 44 | Example 45 | Comparative Example 19 |
|---|---|---|---|---|---|---|---|---|---|
| Formulation Evaluation | Ammonium hydrogen carbonate | — | 0.2 | 0.5 | 1 | 5 | 10 | 20 | 30 |
|  | Amount of unreacted coupling agent | 18.4 | 16.5 | 8.5 | 4.2 | 0 | 0 | 0 | 0 |
|  | Abrasion index | 100 | 100 | 101 | 104 | 110 | 108 | 103 | 97 |
|  | Rolling resistance index | 100 | 99 | 103 | 108 | 113 | 110 | 108 | 101 |

TABLE 1-continued

Rubber component: SBR 100 parts by mass
(Production Example 1: Production Method 1 (Si266))

|  |  | Comparative Example 1 | Comparative Example 20 | Example 46 | Example 47 | Example 48 | Example 49 | Example 50 | Comparative Example 21 |
|---|---|---|---|---|---|---|---|---|---|
| Formulation | Potassium carbonate (1) | — | 0.2 | 0.5 | 1 | 5 | 10 | 20 | 30 |
| Evaluation | Amount of unreacted coupling agent | 18.4 | 15.6 | 1.2 | 0.4 | 0 | 0 | 0 | 0 |
|  | Abrasion index | 100 | 99 | 101 | 102 | 103 | 103 | 100 | 98 |
|  | Rolling resistance index | 100 | 100 | 107 | 112 | 113 | 110 | 108 | 101 |

TABLE 2

Rubber component: SBR 100 parts by mass
(Production Example 2: Production Method 2 (Si266))

|  |  | Comparative Example 22 | Comparative Example 23 | Example 51 | Example 52 | Example 53 | Example 54 | Example 55 | Comparative Example 24 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 18.6 | 15.6 | 7.2 | 2.5 | 0.7 | 0 | 0 | 0 |
|  | Abrasion index | 100 | 100 | 101 | 104 | 106 | 105 | 103 | 94 |
|  | Rolling resistance index | 100 | 99 | 102 | 105 | 110 | 107 | 103 | 98 |

|  |  | Comparative Example 22 | Comparative Example 25 | Example 56 | Example 57 | Example 58 | Example 59 | Example 60 | Comparative Example 26 |
|---|---|---|---|---|---|---|---|---|---|
| Formulation | Potassium carbonate (2) | — | 0.2 | 0.5 | 1 | 5 | 10 | 20 | 30 |
| Evaluation | Amount of unreacted coupling agent | 18.6 | 14.8 | 1.5 | 0.2 | 0 | 0 | 0 | 0 |
|  | Abrasion index | 100 | 100 | 102 | 103 | 107 | 106 | 104 | 96 |
|  | Rolling resistance index | 100 | 98 | 108 | 110 | 112 | 109 | 106 | 98 |

|  |  | Comparative Example 22 | Comparative Example 27 | Example 61 | Example 62 | Example 63 | Example 64 | Example 65 | Comparative Example 28 |
|---|---|---|---|---|---|---|---|---|---|
| Formulation | Potassium carbonate (1) | — | 0.2 | 0.5 | 1 | 5 | 10 | 20 | 30 |
| Evaluation | Amount of unreacted coupling agent | 18.6 | 15.8 | 2.9 | 1.5 | 0.6 | 0.1 | 0 | 0 |
|  | Abrasion index | 100 | 100 | 101 | 101 | 102 | 102 | 101 | 97 |
|  | Rolling resistance index | 100 | 99 | 105 | 108 | 110 | 107 | 104 | 96 |

|  |  | Comparative Example 22 | Comparative Example 29 | Example 66 | Example 67 | Example 68 | Example 69 | Example 70 | Comparative Example 30 |
|---|---|---|---|---|---|---|---|---|---|
| Formulation | Ammonium hydrogen carbonate | — | 0.2 | 0.5 | 1 | 5 | 10 | 20 | 30 |
| Evaluation | Amount of unreacted coupling agent | 18.6 | 16.9 | 9.2 | 5.2 | 2.5 | 0.8 | 0 | 0 |
|  | Abrasion index | 100 | 100 | 101 | 103 | 107 | 106 | 102 | 97 |
|  | Rolling resistance index | 100 | 99 | 102 | 106 | 110 | 106 | 104 | 96 |

TABLE 3

Rubber component: SBR 100 parts by mass
(Production Example 3: Production Method 3 (Si266))

|  |  | Comparative Example 31 | Comparative Example 32 | Example 71 | Example 72 | Example 73 | Example 74 | Example 75 | Comparative Example 33 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 19.2 | 16.4 | 8.2 | 4.8 | 2.1 | 0.6 | 0 | 0 |
|  | Abrasion index | 100 | 99 | 101 | 103 | 104 | 103 | 102 | 93 |
|  | Rolling resistance index | 100 | 98 | 101 | 104 | 107 | 105 | 102 | 97 |

|  |  | Comparative Example 31 | Comparative Example 34 | Example 76 | Example 77 | Example 78 | Example 79 | Example 80 | Comparative Example 35 |
|---|---|---|---|---|---|---|---|---|---|
| Formulation | Potassium carbonate (2) | — | 0.2 | 0.5 | 1 | 5 | 10 | 20 | 30 |
| Evaluation | Amount of unreacted coupling agent | 19.2 | 15.6 | 3.5 | 0.9 | 0.1 | 0 | 0 | 0 |

TABLE 3-continued

Rubber component: SBR 100 parts by mass
(Production Example 3: Production Method 3 (Si266))

| | | | | | | | | |
|---|---|---|---|---|---|---|---|---|
| | Abrasion index | 100 | 99 | 101 | 102 | 105 | 104 | 102 | 95 |
| | Rolling resistance index | 100 | 98 | 105 | 107 | 109 | 106 | 104 | 96 |

| | | Comparative Example 31 | Comparative Example 36 | Example 81 | Example 82 | Example 83 | Example 84 | Example 85 | Comparative Example 37 |
|---|---|---|---|---|---|---|---|---|---|
| Formulation | Potassium carbonate (1) | — | 0.2 | 0.5 | 1 | 5 | 10 | 20 | 30 |
| Evaluation | Amount of unreacted coupling agent | 19.2 | 16.2 | 3.8 | 1.9 | 0.8 | 0.4 | 0 | 0 |
| | Abrasion index | 100 | 100 | 101 | 101 | 101 | 102 | 101 | 97 |
| | Rolling resistance index | 100 | 100 | 103 | 106 | 107 | 105 | 102 | 95 |

| | | Comparative Example 31 | Comparative Example 38 | Example 86 | Example 87 | Example 88 | Example 89 | Example 90 | Comparative Example 39 |
|---|---|---|---|---|---|---|---|---|---|
| Formulation | Ammonium hydrogen carbonate | — | 0.2 | 0.5 | 1 | 5 | 10 | 20 | 30 |
| Evaluation | Amount of unreacted coupling agent | 19.2 | 17.6 | 9.9 | 6.4 | 3.5 | 1.6 | 0.5 | 0 |
| | Abrasion index | 100 | 100 | 101 | 102 | 105 | 105 | 102 | 96 |
| | Rolling resistance index | 100 | 99 | 102 | 105 | 107 | 105 | 103 | 94 |

TABLE 4

Rubber component: SBR 100 parts by mass
(Production Example 4: Production Method 1 (Si363))

| | | Comparative Example 40 | Comparative Example 41 | Example 91 | Example 92 | Example 93 | Example 94 | Example 95 | Comparative Example 42 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 14.2 | 11.8 | 4.6 | 0.4 | 0 | 0 | 0 | 0 |
| | Abrasion index | 101 | 101 | 103 | 106 | 110 | 108 | 105 | 100 |
| | Rolling resistance index | 102 | 102 | 104 | 106 | 114 | 112 | 108 | 102 |

| | | Comparative Example 40 | Comparative Example 43 | Example 96 | Example 97 | Example 98 | Example 99 | Example 100 | Comparative Example 44 |
|---|---|---|---|---|---|---|---|---|---|
| Formulation | Potassium carbonate (2) | — | 0.2 | 0.5 | 1 | 5 | 10 | 20 | 30 |
| Evaluation | Amount of unreacted coupling agent | 14.2 | 11.3 | 0.6 | 0 | 0 | 0 | 0 | 0 |
| | Abrasion index | 101 | 102 | 104 | 106 | 114 | 110 | 108 | 100 |
| | Rolling resistance index | 102 | 101 | 109 | 114 | 117 | 113 | 110 | 102 |

| | | Comparative Example 40 | Comparative Example 45 | Example 101 | Example 102 | Example 103 | Example 104 | Example 105 | Comparative Example 46 |
|---|---|---|---|---|---|---|---|---|---|
| Formulation | Potassium carbonate (1) | — | 0.2 | 0.5 | 1 | 5 | 10 | 20 | 30 |
| Evaluation | Amount of unreacted coupling agent | 14.2 | 12.1 | 1.5 | 0.1 | 0 | 0 | 0 | 0 |
| | Abrasion index | 101 | 101 | 103 | 104 | 105 | 104 | 103 | 101 |
| | Rolling resistance index | 102 | 101 | 108 | 113 | 115 | 112 | 108 | 101 |

| | | Comparative Example 40 | Comparative Example 47 | Example 106 | Example 107 | Example 108 | Example 109 | Example 110 | Comparative Example 48 |
|---|---|---|---|---|---|---|---|---|---|
| Formulation | Ammonium hydrogen carbonate | — | 0.2 | 0.5 | 1 | 5 | 10 | 20 | 30 |
| Evaluation | Amount of unreacted coupling agent | 14.2 | 12.8 | 7.4 | 3.0 | 0 | 0 | 0 | 0 |
| | Abrasion index | 101 | 101 | 102 | 108 | 114 | 109 | 104 | 100 |
| | Rolling resistance index | 102 | 101 | 104 | 110 | 115 | 111 | 109 | 101 |

TABLE 5

Rubber component: SBR 100 parts by mass
(Production Example 5: Production Method 2 (Si363))

| | | Comparative Example 49 | Comparative Example 50 | Example 111 | Example 112 | Example 113 | Example 114 | Example 115 | Comparative Example 51 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 14.8 | 12.5 | 7.0 | 2.5 | 0.8 | 0.2 | 0 | 0 |
| | Abrasion index | 101 | 101 | 102 | 104 | 107 | 106 | 102 | 100 |
| | Rolling resistance index | 101 | 101 | 103 | 106 | 112 | 109 | 105 | 101 |
| | | Comparative Example 49 | Comparative Example 52 | Example 116 | Example 117 | Example 118 | Example 119 | Example 120 | Comparative Example 53 |
| Formulation | Potassium carbonate (2) | — | 0.2 | 0.5 | 1 | 5 | 10 | 20 | 30 |
| Evaluation | Amount of unreacted coupling agent | 14.8 | 11.7 | 2.5 | 0.8 | 0.2 | 0 | 0 | 0 |
| | Abrasion index | 101 | 101 | 103 | 105 | 112 | 107 | 105 | 101 |
| | Rolling resistance index | 101 | 101 | 109 | 112 | 114 | 110 | 106 | 101 |
| | | Comparative Example 49 | Comparative Example 54 | Example 121 | Example 122 | Example 123 | Example 124 | Example 125 | Comparative Example 55 |
| Formulation | Potassium carbonate (1) | — | 0.2 | 0.5 | 1 | 5 | 10 | 20 | 30 |
| Evaluation | Amount of unreacted coupling agent | 14.8 | 13.2 | 3.5 | 1.5 | 0.5 | 0 | 0 | 0 |
| | Abrasion index | 101 | 101 | 102 | 103 | 104 | 104 | 102 | 101 |
| | Rolling resistance index | 101 | 101 | 105 | 108 | 111 | 106 | 104 | 101 |
| | | Comparative Example 49 | Comparative Example 56 | Example 126 | Example 127 | Example 128 | Example 129 | Example 130 | Comparative Example 57 |
| Formulation | Ammonium hydrogen carbonate | — | 0.2 | 0.5 | 1 | 5 | 10 | 20 | 30 |
| Evaluation | Amount of unreacted coupling agent | 14.8 | 13.4 | 8.4 | 4.0 | 0.8 | 0 | 0 | 0 |
| | Abrasion index | 101 | 101 | 101 | 106 | 110 | 106 | 103 | 100 |
| | Rolling resistance index | 101 | 101 | 103 | 108 | 114 | 107 | 105 | 101 |

TABLE 6

Rubber component: SBR 100 parts by mass
(Production Example 6: Production Method 1 (NXT-Z45))

| | | Comparative Example 58 | Comparative Example 59 | Example 131 | Example 132 | Example 133 | Example 134 | Example 135 | Comparative Example 60 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 11.2 | 10.8 | 2.5 | 0 | 0 | 0 | 0 | 0 |
| | Abrasion index | 103 | 102 | 105 | 107 | 113 | 110 | 108 | 102 |
| | Rolling resistance index | 102 | 102 | 106 | 108 | 116 | 114 | 112 | 102 |
| | | Comparative Example 58 | Comparative Example 61 | Example 136 | Example 137 | Example 138 | Example 139 | Example 140 | Comparative Example 62 |
| Formulation | Potassium carbonate (2) | — | 0.2 | 0.5 | 1 | 5 | 10 | 20 | 30 |
| Evaluation | Amount of unreacted coupling agent | 11.2 | 10.4 | 0.6 | 0 | 0 | 0 | 0 | 0 |
| | Abrasion index | 103 | 103 | 106 | 110 | 117 | 114 | 110 | 101 |
| | Rolling resistance index | 102 | 102 | 112 | 115 | 118 | 116 | 113 | 103 |
| | | Comparative Example 58 | Comparative Example 63 | Example 141 | Example 142 | Example 143 | Example 144 | Example 145 | Comparative Example 64 |
| Formulation | Potassium carbonate (1) | — | 0.2 | 0.5 | 1 | 5 | 10 | 20 | 30 |
| Evaluation | Amount of unreacted coupling agent | 11.2 | 10.6 | 1.3 | 0.1 | 0 | 0 | 0 | 0 |
| | Abrasion index | 103 | 103 | 104 | 106 | 108 | 107 | 105 | 101 |
| | Rolling resistance index | 102 | 102 | 110 | 114 | 116 | 113 | 109 | 102 |

TABLE 6-continued

Rubber component: SBR 100 parts by mass
(Production Example 6: Production Method 1 (NXT-Z45))

|  |  | Comparative Example 58 | Comparative Example 65 | Example 146 | Example 147 | Example 148 | Example 149 | Example 150 | Comparative Example 66 |
|---|---|---|---|---|---|---|---|---|---|
| Formulation | Ammonium hydrogen carbonate | — | 0.2 | 0.5 | 1 | 5 | 10 | 20 | 30 |
| Evaluation | Amount of unreacted coupling agent | 11.2 | 10.5 | 6.4 | 2.5 | 0.4 | 0 | 0 | 0 |
|  | Abrasion index | 103 | 102 | 104 | 109 | 115 | 112 | 106 | 101 |
|  | Rolling resistance index | 102 | 102 | 104 | 112 | 117 | 112 | 110 | 102 |

TABLE 7

Rubber component: SBR 100 parts by mass
(Production Example 7: Production Method 2 (NXT-Z45))

|  |  | Comparative Example 67 | Comparative Example 68 | Example 151 | Example 152 | Example 153 | Example 154 | Example 155 | Comparative Example 69 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 12.0 | 11.0 | 5.9 | 2.4 | 0.5 | 0 | 0 | 0 |
|  | Abrasion index | 102 | 102 | 103 | 105 | 109 | 106 | 104 | 101 |
|  | Rolling resistance index | 102 | 102 | 105 | 107 | 113 | 111 | 106 | 101 |

|  |  | Comparative Example 67 | Comparative Example 70 | Example 156 | Example 157 | Example 158 | Example 159 | Example 160 | Comparative Example 71 |
|---|---|---|---|---|---|---|---|---|---|
| Formulation | Potassium carbonate (2) | — | 0.2 | 0.5 | 1 | 5 | 10 | 20 | 30 |
| Evaluation | Amount of unreacted coupling agent | 12.0 | 10.4 | 2.0 | 0.5 | 0.1 | 0 | 0 | 0 |
|  | Abrasion index | 102 | 102 | 105 | 108 | 114 | 112 | 106 | 101 |
|  | Rolling resistance index | 102 | 102 | 108 | 112 | 115 | 113 | 108 | 102 |

|  |  | Comparative Example 67 | Comparative Example 72 | Example 161 | Example 162 | Example 163 | Example 164 | Example 165 | Comparative Example 73 |
|---|---|---|---|---|---|---|---|---|---|
| Formulation | Potassium carbonate (1) | — | 0.2 | 0.5 | 1 | 5 | 10 | 20 | 30 |
| Evaluation | Amount of unreacted coupling agent | 12.0 | 10.9 | 2.4 | 0.9 | 0.6 | 0.1 | 0 | 0 |
|  | Abrasion index | 102 | 102 | 103 | 104 | 105 | 105 | 104 | 101 |
|  | Rolling resistance index | 102 | 102 | 106 | 110 | 108 | 107 | 104 | 102 |

|  |  | Comparative Example 67 | Comparative Example 74 | Example 166 | Example 167 | Example 168 | Example 169 | Example 170 | Comparative Example 75 |
|---|---|---|---|---|---|---|---|---|---|
| Formulation | Ammonium hydrogen carbonate | — | 0.2 | 0.5 | 1 | 5 | 10 | 20 | 30 |
| Evaluation | Amount of unreacted coupling agent | 12.0 | 10.8 | 7.8 | 3.5 | 1.8 | 0.6 | 0 | 0 |
|  | Abrasion index | 102 | 102 | 104 | 105 | 108 | 104 | 103 | 101 |
|  | Rolling resistance index | 102 | 102 | 103 | 108 | 115 | 109 | 104 | 102 |

TABLE 8

Rubber component: SBR 70 parts by mass, NR 30 parts by mass
(Production Example 8: Production Method 1 (Si266))

|  |  | Comparative Example 76 | Comparative Example 77 | Example 171 | Example 172 | Example 173 | Example 174 | Example 175 | Comparative Example 78 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 19.7 | 17.8 | 7.6 | 4.5 | 2.1 | 0.5 | 0 | 0 |
|  | Abrasion index | 112 | 111 | 116 | 122 | 123 | 118 | 116 | 106 |
|  | Rolling resistance index | 108 | 108 | 111 | 114 | 120 | 116 | 114 | 108 |

|  |  | Comparative Example 76 | Comparative Example 79 | Example 176 | Example 177 | Example 178 | Example 179 | Example 180 | Comparative Example 80 |
|---|---|---|---|---|---|---|---|---|---|
| Formulation | Potassium carbonate (2) | — | 0.2 | 0.5 | 1 | 5 | 10 | 20 | 30 |
| Evaluation | Amount of unreacted coupling agent | 19.7 | 16.8 | 5.5 | 2.4 | 1.1 | 0 | 0 | 0 |

TABLE 8-continued

Rubber component: SBR 70 parts by mass, NR 30 parts by mass
(Production Example 8: Production Method 1 (Si266))

|  |  |  |  |  |  |  |  |  |
|---|---|---|---|---|---|---|---|---|
|  | Abrasion index | 112 | 111 | 115 | 116 | 123 | 121 | 117 | 110 |
|  | Rolling resistance index | 108 | 108 | 116 | 121 | 125 | 120 | 115 | 109 |

|  |  | Comparative Example 76 | Comparative Example 81 | Example 181 | Example 182 | Example 183 | Example 184 | Example 185 | Comparative Example 82 |
|---|---|---|---|---|---|---|---|---|---|
| Formulation Evaluation | Ammonium carbonate | — | 0.2 | 0.5 | 1 | 5 | 10 | 20 | 30 |
|  | Amount of unreacted coupling agent | 19.7 | 16.8 | 8.1 | 2.5 | 0 | 0 | 0 | 0 |
|  | Abrasion index | 112 | 111 | 118 | 120 | 122 | 122 | 117 | 106 |
|  | Rolling resistance index | 108 | 108 | 113 | 121 | 121 | 118 | 109 | 107 |

|  |  | Comparative Example 76 | Comparative Example 83 | Example 186 | Example 187 | Example 188 | Example 189 | Example 190 | Comparative Example 84 |
|---|---|---|---|---|---|---|---|---|---|
| Formulation Evaluation | Lithium carbonate | — | 0.2 | 0.5 | 1 | 5 | 10 | 20 | 30 |
|  | Amount of unreacted coupling agent | 19.7 | 16.3 | 6.5 | 3.4 | 1.5 | 0 | 0 | 0 |
|  | Abrasion index | 112 | 112 | 115 | 118 | 120 | 114 | 114 | 109 |
|  | Rolling resistance index | 108 | 110 | 112 | 114 | 119 | 114 | 112 | 109 |

|  |  | Comparative Example 76 | Comparative Example 85 | Example 191 | Example 192 | Example 193 | Example 194 | Example 195 | Comparative Example 86 |
|---|---|---|---|---|---|---|---|---|---|
| Formulation Evaluation | Calcium carbonate | — | 0.2 | 0.5 | 1 | 5 | 10 | 20 | 30 |
|  | Amount of unreacted coupling agent | 19.7 | 17.8 | 8.8 | 4.3 | 2 | 0 | 0 | 0 |
|  | Abrasion index | 112 | 111 | 114 | 116 | 118 | 117 | 116 | 109 |
|  | Rolling resistance index | 108 | 107 | 110 | 111 | 116 | 121 | 113 | 109 |

|  |  | Comparative Example 76 | Comparative Example 87 | Example 196 | Example 197 | Example 198 | Example 199 | Example 200 | Comparative Example 88 |
|---|---|---|---|---|---|---|---|---|---|
| Formulation Evaluation | Magnesium carbonate | — | 0.2 | 0.5 | 1 | 5 | 10 | 20 | 30 |
|  | Amount of unreacted coupling agent | 19.7 | 17.6 | 8.8 | 4.6 | 2.5 | 1.0 | 0 | 0 |
|  | Abrasion index | 112 | 112 | 115 | 116 | 116 | 116 | 115 | 109 |
|  | Rolling resistance index | 108 | 108 | 111 | 112 | 119 | 117 | 113 | 107 |

|  |  | Comparative Example 76 | Comparative Example 89 | Example 201 | Example 202 | Example 203 | Example 204 | Example 205 | Comparative Example 90 |
|---|---|---|---|---|---|---|---|---|---|
| Formulation Evaluation | Potassium hydrogen carbonate | — | 0.2 | 0.5 | 1 | 5 | 10 | 20 | 30 |
|  | Amount of unreacted coupling agent | 19.7 | 16.8 | 4.0 | 1.8 | 0 | 0 | 0 | 0 |
|  | Abrasion index | 112 | 111 | 114 | 118 | 121 | 119 | 116 | 109 |
|  | Rolling resistance index | 108 | 107 | 110 | 110 | 114 | 115 | 112 | 109 |

|  |  | Comparative Example 76 | Comparative Example 91 | Example 206 | Example 207 | Example 208 | Example 209 | Example 210 | Comparative Example 92 |
|---|---|---|---|---|---|---|---|---|---|
| Formulation Evaluation | Sodium hydrogen carbonate | — | 0.2 | 0.5 | 1 | 5 | 10 | 20 | 30 |
|  | Amount of unreacted coupling agent | 19.7 | 17.2 | 6.4 | 3.0 | 1.0 | 0 | 0 | 0 |
|  | Abrasion index | 112 | 111 | 114 | 117 | 120 | 115 | 114 | 109 |
|  | Rolling resistance index | 108 | 109 | 111 | 112 | 114 | 116 | 111 | 109 |

|  |  | Comparative Example 76 | Comparative Example 93 | Example 211 | Example 212 | Example 213 | Example 214 | Example 215 | Comparative Example 94 |
|---|---|---|---|---|---|---|---|---|---|
| Formulation Evaluation | Ammonium hydrogen carbonate | — | 0.2 | 0.5 | 1 | 5 | 10 | 20 | 30 |
|  | Amount of unreacted coupling agent | 19.7 | 17.6 | 8.9 | 56 | 2.4 | 0.8 | 0 | 0 |
|  | Abrasion index | 112 | 112 | 114 | 116 | 122 | 121 | 115 | 109 |
|  | Rolling resistance index | 108 | 108 | 112 | 116 | 121 | 119 | 117 | 110 |

|  |  | Comparative Example 76 | Comparative Example 95 | Example 216 | Example 217 | Example 218 | Example 219 | Example 220 | Comparative Example 96 |
|---|---|---|---|---|---|---|---|---|---|
| Formulation Evaluation | Potassium carbonate (1) | — | 0.2 | 0.5 | 1 | 5 | 10 | 20 | 30 |
|  | Amount of unreacted coupling agent | 19.7 | 18.2 | 9.6 | 6.5 | 3.2 | 2.6 | 0 | 0 |
|  | Abrasion index | 112 | 111 | 114 | 115 | 115 | 115 | 113 | 108 |
|  | Rolling resistance index | 108 | 109 | 114 | 121 | 121 | 120 | 116 | 110 |

TABLE 9

Rubber component: SBR 70 parts by mass, NR 30 parts by mass
(Production Example 9: Production Method 1 (Si363))

| | | Comparative Example 97 | Comparative Example 98 | Example 221 | Example 222 | Example 223 | Example 224 | Example 225 | Comparative Example 99 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 15.4 | 12.6 | 6.0 | 2.9 | 0.8 | 0 | 0 | 0 |
| | Abrasion index | 113 | 113 | 116 | 124 | 124 | 122 | 118 | 112 |
| | Rolling resistance index | 109 | 110 | 113 | 116 | 127 | 124 | 120 | 110 |

| | | Comparative Example 97 | Comparative Example 100 | Example 226 | Example 227 | Example 228 | Example 229 | Example 230 | Comparative Example 101 |
|---|---|---|---|---|---|---|---|---|---|
| Formulation | Potassium carbonate (2) | — | 0.2 | 0.5 | 1 | 5 | 10 | 20 | 30 |
| Evaluation | Amount of unreacted coupling agent | 15.4 | 12.7 | 2.6 | 0.8 | 0 | 0 | 0 | 0 |
| | Abrasion index | 113 | 112 | 115 | 120 | 126 | 123 | 119 | 113 |
| | Rolling resistance index | 109 | 109 | 116 | 124 | 126 | 122 | 119 | 108 |

| | | Comparative Example 97 | Comparative Example 102 | Example 231 | Example 232 | Example 233 | Example 234 | Example 235 | Comparative Example 103 |
|---|---|---|---|---|---|---|---|---|---|
| Formulation | Potassium carbonate (1) | — | 0.2 | 0.5 | 1 | 5 | 10 | 20 | 30 |
| Evaluation | Amount of unreacted coupling agent | 15.4 | 12.8 | 4.5 | 1.6 | 0.5 | 0 | 0 | 0 |
| | Abrasion index | 113 | 112 | 115 | 117 | 119 | 117 | 116 | 110 |
| | Rolling resistance index | 109 | 110 | 114 | 125 | 124 | 124 | 120 | 108 |

| | | Comparative Example 97 | Comparative Example 104 | Example 236 | Example 237 | Example 238 | Example 239 | Example 240 | Comparative Example 105 |
|---|---|---|---|---|---|---|---|---|---|
| Formulation | Ammonium hydrogen carbonate | — | 0.2 | 0.5 | 1 | 5 | 10 | 20 | 30 |
| Evaluation | Amount of unreacted coupling agent | 15.4 | 12.8 | 7.4 | 3.0 | 0 | 0 | 0 | 0 |
| | Abrasion index | 113 | 113 | 116 | 121 | 126 | 122 | 117 | 113 |
| | Rolling resistance index | 109 | 108 | 113 | 120 | 124 | 119 | 117 | 109 |

TABLE 10

Rubber component: SBR 70 parts by mass, NR 30 parts by mass
(Production Example 10: Production Method 1 (NXT-Z45))

| | | Comparative Example 106 | Comparative Example 107 | Example 241 | Example 242 | Example 243 | Example 244 | Example 245 | Comparative Example 108 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 12.5 | 11.2 | 6.5 | 3.1 | 1.2 | 0 | 0 | 0 |
| | Abrasion index | 114 | 114 | 120 | 124 | 126 | 126 | 123 | 113 |
| | Rolling resistance index | 110 | 110 | 114 | 118 | 128 | 125 | 122 | 111 |

| | | Comparative Example 106 | Comparative Example 109 | Example 246 | Example 247 | Example 248 | Example 249 | Example 250 | Comparative Example 110 |
|---|---|---|---|---|---|---|---|---|---|
| Formulation | Potassium carbonate (2) | — | 0.2 | 0.5 | 1 | 5 | 10 | 20 | 30 |
| Evaluation | Amount of unreacted coupling agent | 12.5 | 11.0 | 5.6 | 2.3 | 0.6 | 0 | 0 | 0 |
| | Abrasion index | 114 | 113 | 120 | 125 | 130 | 126 | 124 | 114 |
| | Rolling resistance index | 110 | 110 | 116 | 125 | 127 | 126 | 123 | 109 |

| | | Comparative Example 106 | Comparative Example 111 | Example 251 | Example 252 | Example 253 | Example 254 | Example 255 | Comparative Example 112 |
|---|---|---|---|---|---|---|---|---|---|
| Formulation | Potassium carbonate (1) | — | 0.2 | 0.5 | 1 | 5 | 10 | 20 | 30 |
| Evaluation | Amount of unreacted coupling agent | 12.5 | 11.5 | 7.8 | 4.6 | 2.0 | 0.9 | 0 | 0 |
| | Abrasion index | 114 | 115 | 120 | 122 | 123 | 122 | 120 | 114 |
| | Rolling resistance index | 110 | 110 | 115 | 123 | 124 | 122 | 118 | 111 |

TABLE 10-continued

Rubber component: SBR 70 parts by mass, NR 30 parts by mass
(Production Example 10: Production Method 1 (NXT-Z45))

|  |  | Comparative Example 106 | Comparative Example 113 | Example 256 | Example 257 | Example 258 | Example 259 | Example 260 | Comparative Example 114 |
|---|---|---|---|---|---|---|---|---|---|
| Formulation | Ammonium hydrogen carbonate | — | 0.2 | 0.5 | 1 | 5 | 10 | 20 | 30 |
| Evaluation | Amount of unreacted coupling agent | 12.5 | 12.0 | 8.9 | 6.1 | 3.6 | 0.8 | 0 | 0 |
|  | Abrasion index | 114 | 115 | 118 | 124 | 127 | 123 | 120 | 113 |
|  | Rolling resistance index | 110 | 111 | 115 | 124 | 129 | 125 | 120 | 111 |

TABLE 11

Rubber component: SBR 70 parts by mass, NR 30 parts by mass
(Production Example 11: Production Method 2 (Si266))

|  |  | Comparative Example 115 | Comparative Example 116 | Example 261 | Example 262 | Example 263 | Example 264 | Example 265 | Comparative Example 117 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 20.7 | 18.4 | 8.6 | 5.3 | 2.8 | 1.5 | 0.8 | 0 |
|  | Abrasion index | 110 | 109 | 113 | 120 | 121 | 114 | 114 | 107 |
|  | Rolling resistance index | 106 | 106 | 110 | 113 | 115 | 114 | 113 | 107 |

|  |  | Comparative Example 115 | Comparative Example 118 | Example 266 | Example 267 | Example 268 | Example 269 | Example 270 | Comparative Example 119 |
|---|---|---|---|---|---|---|---|---|---|
| Formulation | Potassium carbonate (2) | — | 0.2 | 0.5 | 1 | 5 | 10 | 20 | 30 |
| Evaluation | Amount of unreacted coupling agent | 20.7 | 17.8 | 6.9 | 3.2 | 1.2 | 0.1 | 0 | 0 |
|  | Abrasion index | 110 | 109 | 114 | 114 | 120 | 117 | 114 | 107 |
|  | Rolling resistance index | 106 | 106 | 112 | 116 | 117 | 115 | 114 | 106 |

|  |  | Comparative Example 115 | Comparative Example 120 | Example 271 | Example 272 | Example 273 | Example 274 | Example 275 | Comparative Example 121 |
|---|---|---|---|---|---|---|---|---|---|
| Formulation | Ammonium carbonate | — | 0.2 | 0.5 | 1 | 5 | 10 | 20 | 30 |
| Evaluation | Amount of unreacted coupling agent | 20.7 | 17.6 | 9.6 | 5.6 | 2.5 | 1.0 | 0 | 0 |
|  | Abrasion index | 110 | 110 | 116 | 118 | 121 | 118 | 115 | 108 |
|  | Rolling resistance index | 106 | 105 | 112 | 118 | 117 | 116 | 109 | 105 |

|  |  | Comparative Example 115 | Comparative Example 122 | Example 276 | Example 277 | Example 278 | Example 279 | Example 280 | Comparative Example 123 |
|---|---|---|---|---|---|---|---|---|---|
| Formulation | Lithium carbonate | — | 0.2 | 0.5 | 1 | 5 | 10 | 20 | 30 |
| Evaluation | Amount of unreacted coupling agent | 20.7 | 18.3 | 7.9 | 4.6 | 2.5 | 1.2 | 0 | 0 |
|  | Abrasion index | 110 | 108 | 114 | 116 | 118 | 114 | 113 | 108 |
|  | Rolling resistance index | 106 | 105 | 110 | 112 | 116 | 113 | 111 | 106 |

|  |  | Comparative Example 115 | Comparative Example 124 | Example 281 | Example 282 | Example 283 | Example 284 | Example 285 | Comparative Example 125 |
|---|---|---|---|---|---|---|---|---|---|
| Formulation | Calcium carbonate | — | 0.2 | 0.5 | 1 | 5 | 10 | 20 | 30 |
| Evaluation | Amount of unreacted coupling agent | 20.7 | 18.4 | 9.2 | 5.3 | 2.8 | 1.4 | 0.1 | 0 |
|  | Abrasion index | 110 | 110 | 112 | 114 | 116 | 114 | 113 | 109 |
|  | Rolling resistance index | 106 | 105 | 110 | 111 | 114 | 116 | 110 | 104 |

|  |  | Comparative Example 115 | Comparative Example 126 | Example 286 | Example 287 | Example 288 | Example 289 | Example 290 | Comparative Example 127 |
|---|---|---|---|---|---|---|---|---|---|
| Formulation | Magnesium carbonate | — | 0.2 | 0.5 | 1 | 5 | 10 | 20 | 30 |
| Evaluation | Amount of unreacted coupling agent | 20.7 | 19.4 | 9.8 | 5.4 | 3.1 | 1.4 | 0.5 | 0 |
|  | Abrasion index | 110 | 109 | 113 | 114 | 115 | 114 | 113 | 109 |
|  | Rolling resistance index | 106 | 106 | 110 | 111 | 117 | 115 | 114 | 104 |

|  |  | Comparative Example 115 | Comparative Example 128 | Example 291 | Example 292 | Example 293 | Example 294 | Example 295 | Comparative Example 129 |
|---|---|---|---|---|---|---|---|---|---|
| Formulation | Potassium hydrogen carbonate | — | 0.2 | 0.5 | 1 | 5 | 10 | 20 | 30 |
| Evaluation | Amount of unreacted coupling agent | 20.7 | 18.4 | 6.5 | 2.7 | 1.1 | 0 | 0 | 0 |

TABLE 11-continued

Rubber component: SBR 70 parts by mass, NR 30 parts by mass
(Production Example 11: Production Method 2 (Si266))

|  |  |  |  |  |  |  |  |  |
|---|---|---|---|---|---|---|---|---|
|  | Abrasion index | 110 | 109 | 113 | 115 | 118 | 115 | 113 | 110 |
|  | Rolling resistance index | 106 | 105 | 110 | 110 | 113 | 114 | 112 | 106 |

|  |  | Comparative Example 115 | Comparative Example 130 | Example 296 | Example 297 | Example 298 | Example 299 | Example 300 | Comparative Example 131 |
|---|---|---|---|---|---|---|---|---|---|
| Formulation | Sodium hydrogen carbonate | — | 0.2 | 0.5 | 1 | 5 | 10 | 20 | 30 |
| Evaluation | Amount of unreacted coupling agent | 20.7 | 18.4 | 7.4 | 4.2 | 2.0 | 0.6 | 0 | 0 |
|  | Abrasion index | 110 | 108 | 113 | 116 | 118 | 114 | 113 | 109 |
|  | Rolling resistance index | 106 | 106 | 111 | 111 | 113 | 114 | 111 | 104 |

|  |  | Comparative Example 115 | Comparative Example 132 | Example 301 | Example 302 | Example 303 | Example 304 | Example 305 | Comparative Example 133 |
|---|---|---|---|---|---|---|---|---|---|
| Formulation | Ammonium hydrogen carbonate | — | 0.2 | 0.5 | 1 | 5 | 10 | 20 | 30 |
|  | Amount of unreacted coupling agent | 20.7 | 19.3 | 9.9 | 6.2 | 4.1 | 2.2 | 0.6 | 0 |
| Evaluation | Abrasion index | 110 | 108 | 113 | 115 | 120 | 119 | 114 | 107 |
|  | Rolling resistance index | 106 | 105 | 111 | 114 | 118 | 116 | 114 | 105 |

|  |  | Comparative Example 115 | Comparative Example 134 | Example 306 | Example 307 | Example 308 | Example 309 | Example 310 | Comparative Example 135 |
|---|---|---|---|---|---|---|---|---|---|
| Formulation | Potassium carbonate (1) | — | 0.2 | 0.5 | 1 | 5 | 10 | 20 | 30 |
| Evaluation | Amount of unreacted coupling agent | 20.7 | 19.9 | 9.9 | 6.9 | 4.0 | 2.7 | 1.2 | 0.2 |
|  | Abrasion index | 110 | 109 | 113 | 114 | 114 | 114 | 112 | 107 |
|  | Rolling resistance index | 106 | 106 | 112 | 116 | 114 | 115 | 112 | 105 |

TABLE 12

Rubber component: SBR 70 parts by mass, NR 30 parts by mass
(Production Example 12: Production Method 2 (Si363))

|  |  | Comparative Example 136 | Comparative Example 137 | Example 311 | Example 312 | Example 313 | Example 314 | Example 315 | Comparative Example 138 |
|---|---|---|---|---|---|---|---|---|---|
| Formulation | Sodium carbonate | — | 0.2 | 0.5 | 1 | 5 | 10 | 20 | 30 |
| Evaluation | Amount of unreacted coupling agent | 16.8 | 14.1 | 7.8 | 3.9 | 2.2 | 1.0 | 0.2 | 0 |
|  | Abrasion index | 111 | 111 | 114 | 121 | 123 | 119 | 116 | 110 |
|  | Rolling resistance index | 107 | 108 | 112 | 114 | 123 | 119 | 115 | 106 |

|  |  | Comparative Example 136 | Comparative Example 139 | Example 316 | Example 317 | Example 318 | Example 319 | Example 320 | Comparative Example 140 |
|---|---|---|---|---|---|---|---|---|---|
| Formulation | Potassium carbonate (2) | — | 0.2 | 0.5 | 1 | 5 | 10 | 20 | 30 |
| Evaluation | Amount of unreacted coupling agent | 16.8 | 13.2 | 3.5 | 1.0 | 0.1 | 0 | 0 | 0 |
|  | Abrasion index | 111 | 110 | 114 | 118 | 122 | 118 | 114 | 108 |
|  | Rolling resistance index | 107 | 106 | 112 | 120 | 118 | 116 | 115 | 106 |

|  |  | Comparative Example 136 | Comparative Example 141 | Example 321 | Example 322 | Example 323 | Example 324 | Example 325 | Comparative Example 142 |
|---|---|---|---|---|---|---|---|---|---|
| Formulation | Potassium carbonate (1) | — | 0.2 | 0.5 | 1 | 5 | 10 | 20 | 30 |
| Evaluation | Amount of unreacted coupling agent | 16.8 | 14.0 | 5.4 | 2.6 | 1.3 | 0.4 | 0 | 0 |
|  | Abrasion index | 111 | 110 | 114 | 116 | 117 | 115 | 113 | 107 |
|  | Rolling resistance index | 107 | 106 | 113 | 115 | 115 | 116 | 113 | 103 |

|  |  | Comparative Example 136 | Comparative Example 143 | Example 326 | Example 327 | Example 328 | Example 329 | Example 330 | Comparative Example 144 |
|---|---|---|---|---|---|---|---|---|---|
| Formulation | Ammonium hydrogen carbonate | — | 0.2 | 0.5 | 1 | 5 | 10 | 20 | 30 |
| Evaluation | Amount of unreacted coupling agent | 16.8 | 15.4 | 8.4 | 5.0 | 2.5 | 1.1 | 0 | 0 |
|  | Abrasion index | 111 | 109 | 114 | 118 | 120 | 118 | 114 | 108 |
|  | Rolling resistance index | 107 | 107 | 112 | 118 | 122 | 118 | 114 | 105 |

TABLE 13

Rubber component: SBR 70 parts by mass, NR 30 parts by mass
(Production Example 13: Production Method 2 (NXT-Z45))

| | | Comparative Example 145 | Comparative Example 146 | Example 331 | Example 332 | Example 333 | Example 334 | Example 335 | Comparative Example 147 |
|---|---|---|---|---|---|---|---|---|---|
| Formulation Evaluation | Sodium carbonate | — | 0.2 | 0.5 | 1 | 5 | 10 | 20 | 30 |
| | Amount of unreacted coupling agent | 13.8 | 11.9 | 7.6 | 3.8 | 1.8 | 0.5 | 0 | 0 |
| | Abrasion index | 112 | 112 | 116 | 122 | 123 | 121 | 117 | 111 |
| | Rolling resistance index | 106 | 107 | 113 | 116 | 124 | 122 | 117 | 106 |

| | | Comparative Example 145 | Comparative Example 148 | Example 336 | Example 337 | Example 338 | Example 339 | Example 340 | Comparative Example 149 |
|---|---|---|---|---|---|---|---|---|---|
| Formulation Evaluation | Potassium carbonate (2) | — | 0.2 | 0.5 | 1 | 5 | 10 | 20 | 30 |
| | Amount of unreacted coupling agent | 13.8 | 11.7 | 7.4 | 3.4 | 1.6 | 0.1 | 0 | 0 |
| | Abrasion index | 112 | 111 | 116 | 120 | 124 | 121 | 118 | 111 |
| | Rolling resistance index | 106 | 105 | 115 | 123 | 124 | 122 | 115 | 106 |

| | | Comparative Example 145 | Comparative Example 150 | Example 341 | Example 342 | Example 343 | Example 344 | Example 345 | Comparative Example 151 |
|---|---|---|---|---|---|---|---|---|---|
| Formulation Evaluation | Potassium carbonate (1) | — | 0.2 | 0.5 | 1 | 5 | 10 | 20 | 30 |
| | Amount of unreacted coupling agent | 13.8 | 12.5 | 8.5 | 5.2 | 2.5 | 1.3 | 0.5 | 0 |
| | Abrasion index | 112 | 111 | 115 | 118 | 120 | 118 | 116 | 111 |
| | Rolling resistance index | 106 | 106 | 113 | 120 | 120 | 117 | 115 | 106 |

| | | Comparative Example 145 | Comparative Example 152 | Example 346 | Example 347 | Example 348 | Example 349 | Example 350 | Comparative Example 153 |
|---|---|---|---|---|---|---|---|---|---|
| Formulation Evaluation | Ammonium hydrogen carbonate | — | 0.2 | 0.5 | 1 | 5 | 10 | 20 | 30 |
| | Amount of unreacted coupling agent | 13.8 | 12.0 | 8.9 | 6.1 | 3.6 | 0.8 | 0 | 0 |
| | Abrasion index | 112 | 112 | 117 | 120 | 122 | 120 | 118 | 111 |
| | Rolling resistance index | 106 | 106 | 114 | 122 | 125 | 121 | 116 | 105 |

In the examples in which silica, a silane coupling agent and a predetermined amount of a carbonate salt or hydrogen carbonate salt were contained, the amount of unreacted silane coupling agent was as small as at most 10% by mass, the rate of reaction between the silane coupling agent and the silica was increased, and the fuel economy and abrasion resistance were enhanced, as compared with the comparative examples. In addition, in the examples using silane coupling agent (2) or (3), excellent fuel economy and abrasion resistance were exhibited. In the examples using potassium carbonate (2) with an average particle size of 40 µm or smaller, an increased rate of reaction and superior abrasion resistance were exhibited compared with cases in which potassium carbonate (1) with an average particle size of 340 µm was used. With regard to Production Examples 1 to 3, in Examples 1 to 50 which were obtained by carrying out the first base kneading step, the second base kneading step and the final kneading step (Production Example 1 (Production Method 1)), good fuel economy and abrasion resistance were exhibited. Next to these examples, the improvement effect was large in the examples obtained according to Production Example 2 (Production Method 2) and Production Example 3 (Production Method 3). In contrast, in the comparative examples, the fuel economy and abrasion resistance could not be enhanced in a balanced manner.

In addition, if the content of the carbonate or hydrogen carbonate salt is increased too far, the abrasion resistance tends to deteriorate (for example, see Comparative Examples 3, 5, 7, 9, 11, 13, 15, 17 and 19).

What is claimed:
1. A method for producing a rubber composition for a tire, said method comprising:
   a step (A) of kneading a diene rubber, silica, a silane coupling agent, and at least one of a carbonate salt or a hydrogen carbonate salt, and discharging the resulting kneaded mixture "A";
   a step (B) of kneading the kneaded mixture "A" discharged in the step (A), stearic acid and zinc oxide, and discharging the resulting kneaded mixture "B"; and
   a step (C) of kneading the kneaded mixture "B" discharged in the step (B), a vulcanizing agent and a vulcanization accelerator;
   wherein the diene rubber is at least one selected from the group consisting of natural rubber, isoprene rubber, butadiene rubber and styrene-butadiene rubber,
   wherein the silane coupling agent is at least one selected from the group consisting of sulfide-type silane coupling agents and mercapto-type silane coupling agents,
   wherein the carbonate salt is at least one selected from the group consisting of ammonium carbonate, lithium carbonate, and magnesium carbonate,
   wherein the hydrogen carbonate salt is ammonium hydrogen carbonate,
   wherein the kneading temperature in each of steps (A) and (B) is in the range of 120 to 160° C. and the kneading temperature in step (C) is in the range of 70 to 120° C., and
   wherein in the rubber composition, a content of the silica is 15 to 120 parts by mass relative to 100 parts by mass of the diene rubber, a content of the silane coupling agent is 4 to 15 parts by mass of the silica, and a total content of the at least one of the carbonate salt and the hydrogen carbonate salt is 1 to 20 parts by mass relative to 100 parts by mass of the silica.

2. The method according to claim 1, wherein the diene rubber is solution polymerized styrene-butadiene rubber.

3. The method according to claim 1, wherein the silane coupling agent is at least one selected from the group consisting of a sulfide-type silane coupling agent, a silane coupling agent represented by formula (1):

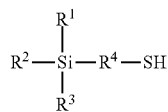
(1)

wherein R1 is a group represented by —O—(R$^5$—O)$_m$—R$^6$ in which m pieces of R$^5$ are the same or different and each denote a branched or unbranched divalent hydrocarbon group having 1 to 30 carbon atoms, R$^6$ denotes a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms, and m is an integer between 1 and 30; R$^2$ and R$^3$ are the same or different and each denote a group as defined for R$^1$, a branched or unbranched alkyl group having 1 to 12 carbon atoms, or a group represented by —O—R$^7$ in which R$^7$ denotes a hydrogen atom, a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms; and R$^8$ denotes a branched or unbranched alkylene group having 1 to 30 carbon atoms, and a silane coupling agent comprising linking units A and B respectively represented by formulae (2) and (3):

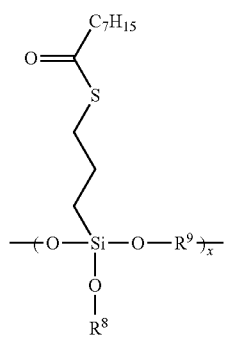
(2)

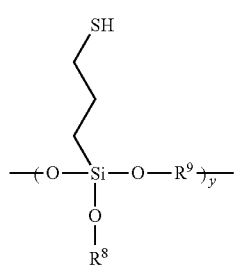
(3)

wherein x is an integer of 0 or higher; y is an integer of 1 or higher; R$^8$ denotes a hydrogen atom, a halogen atom, a branched or unbranched alkyl or alkylene group having 1 to 30 carbon atoms, a branched or unbranched alkenyl or alkenylene group having 2 to 30 carbon atoms, a branched or unbranched alkynyl or alkynylene group having 2 to 30 carbon atoms, or a group in which a terminal of the alkyl or alkenyl group is substituted with a hydroxyl or carboxyl group; R$^9$ denotes a hydrogen atom, a branched or unbranched alkylene or alkyl group having 1 to 30 carbon atoms, a branched or unbranched alkenylene or alkenyl group having 2 to 30 carbon atoms, or a branched or unbranched alkynylene or alkynyl group having 2 to 30 carbon atoms; and R$^8$ and R$^9$ may together form a ring structure.

4. A method for producing a pneumatic tire formed from a rubber composition, said method comprising:
a step (A) of kneading a diene rubber, silica, a silane coupling agent, and at least one of a carbonate salt or a hydrogen carbonate salt, and discharging the resulting kneaded mixture "A";
a step (B) of kneading the kneaded mixture "A" discharged in the step (A), stearic acid and zinc oxide, and discharging the resulting kneaded mixture "B"; and
a step (C) of kneading the kneaded mixture "B" discharged in the step (B), a vulcanizing agent and a vulcanization accelerator;
wherein the diene rubber is at least one selected from the group consisting of natural rubber, isoprene rubber, butadiene rubber and styrene-butadiene rubber,
wherein the silane coupling agent is at least one selected from the group consisting of sulfide-type silane coupling agents and mercapto-type silane coupling agents,
wherein the carbonate salt is at least one selected from the group consisting of ammonium carbonate, lithium carbonate, and magnesium carbonate,
wherein the hydrogen carbonate salt is ammonium hydrogen carbonate,
wherein the kneading temperature in each of steps (A) and (B) is in the range of 120 to 160° C. and the kneading temperature in step (C) is in the range of 70 to 120° C., and
wherein in the rubber composition, a content of the silica is 15 to 120 parts by mass relative to 100 parts by mass of the diene rubber, a content of the silane coupling agent is 4 to 15 parts by mass of the silica, and a total content of the at least one of the carbonate salt and the hydrogen carbonate salt is 1 to 20 parts by mass relative to 100 parts by mass of the silica.

5. A method for producing a rubber composition for a tire, said method comprising:
a step (a) of kneading a diene rubber, silica, a silane coupling agent, and at least one of a carbonate salt or a hydrogen carbonate salt, adding thereto stearic acid and zinc oxide, further kneading them, and discharging the resulting kneaded mixture "a"; and
a step (b) of kneading the kneaded mixture "a" discharged in the step (a), a vulcanizing agent and a vulcanization accelerator;
wherein the diene rubber is at least one selected from the group consisting of natural rubber, isoprene rubber, butadiene rubber and styrene-butadiene rubber,
wherein the silane coupling agent is at least one selected from the group consisting of sulfide-type silane coupling agents and mercapto-type silane coupling agents,
wherein the carbonate salt is at least one selected from the group consisting of ammonium carbonate, lithium carbonate, and magnesium carbonate, wherein the hydrogen carbonate salt is ammonium hydrogen carbonate, wherein the kneading temperature in step (a) is in the range of 120 to 160° C. and the kneading temperature in step (b) is in the range of 70 to 120° C., and wherein in the rubber composition, a content of the silica is 1 to 120 parts by mass relative to 100 parts by mass of the diene rubber, a content of the silane coupling agent is 4 to 15 parts by mass of the silica, and a total content of the at least one of the carbonate salt and the hydrogen carbonate salt is 1 to 20 parts by mass relative to 100 parts by mass of the silica.

6. The method according to claim 5, wherein the diene rubber is solution polymerized styrene-butadiene rubber.

7. The method according to claim 5, wherein the silane coupling agent is at least one selected from the group consisting of a sulfide-type silane coupling agent, a silane coupling agent represented by formula (1):

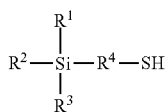
(1)

wherein $R^1$ is a group represented by —O—$(R^5$—O$)_m$—$R^6$ in which m pieces of $R^5$ are the same or different and each denote a branched or unbranched divalent hydrocarbon group having 1 to 30 carbon atoms, $R^6$ denotes a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms, and m is an integer between 1 and 30; $R^2$ and $R^3$ are the same or different and each denote a group as defined for $R^1$, a branched or unbranched alkyl group having 1 to 12 carbon atoms, or a group represented by —O—$R^7$ in which $R^7$ denotes a hydrogen atom, a branched or unbranched alkyl group having 1 to 30 carbon atoms, a branched or unbranched alkenyl group having 2 to 30 carbon atoms, an aryl group having 6 to 30 carbon atoms or an aralkyl group having 7 to 30 carbon atoms; and $R^4$ denotes a branched or unbranched alkylene group having 1 to 30 carbon atoms, and a silane coupling agent comprising linking units A and B respectively represented by formulae (2) and (3):

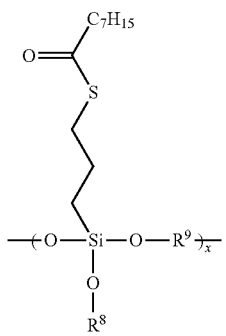
(2)

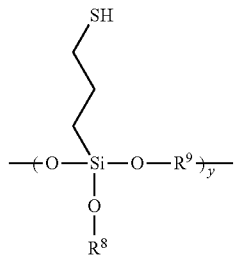
(3)

wherein x is an integer of 0 or higher; y is an integer of 1 or higher; $R^9$ denotes a hydrogen atom, a halogen atom, a branched or unbranched alkyl or alkylene group having 1 to 30 carbon atoms, a branched or unbranched alkenyl or alkenylene group having 2 to 30 carbon atoms, a branched or unbranched alkynyl or alkynylene group having 2 to 30 carbon atoms, or a group in which a terminal of the alkyl or alkenyl group is substituted with a hydroxyl or carboxyl group; $R^9$ denotes a hydrogen atom, a branched or unbranched alkylene or alkyl group having 1 to 30 carbon atoms, a branched or unbranched alkenylene or alkenyl group having 2 to 30 carbon atoms, or a branched or unbranched alkynylene or alkynyl group having 2 to 30 carbon atoms; and $R^8$ and $R^9$ may together form a ring structure.

8. A method for producing a pneumatic tire formed from a rubber composition, said method comprising:

a step (a) of kneading a diene rubber, silica, a silane coupling agent, and at least one of a carbonate salt or a hydrogen carbonate salt, adding thereto stearic acid and zinc oxide, further kneading them and discharging the resulting kneaded mixture "a" and a step (b) of kneading the kneaded mixture "a" discharged in the step (a), a vulcanizing agent and a vulcanization accelerator;

wherein the diene rubber is at least one selected from the group consisting of natural rubber, isoprene rubber, butadiene rubber and styrene-butadiene rubber, wherein the silane coupling agent is at least one selected from the group consisting of sulfide-type silane coupling agents and mercapto-type silane coupling agents, wherein the carbonate salt is at least one selected from the group consisting of ammonium carbonate, lithium carbonate, and magnesium carbonate, wherein the hydrogen carbonate salt is ammonium hydrogen carbonate, wherein the kneading temperature in step (a) is in the range of 120 to 160° C. and the kneading temperature in step (b) is in the range of 70 to 120° C., and wherein in the rubber composition, a content of the silica is 15 to 120 parts by mass relative to 100 parts by mass of the diene rubber, a content of the silane coupling agent is 4 to 15 parts by mass of the silica, and a total content of the at least one of the carbonate salt and the hydrogen carbonate salt is 1 to 20 parts by mass relative to 100 parts by mass of the silica.

* * * * *